(12) United States Patent
Takano

(10) Patent No.: US 9,821,874 B2
(45) Date of Patent: Nov. 21, 2017

(54) VEHICLE

(71) Applicant: YAMAHA HATSUDOKI KABUSHIKI KAISHA, Iwata-shi, Shizuoka (JP)

(72) Inventor: Kazuhisa Takano, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 14/901,353

(22) PCT Filed: Jun. 30, 2014

(86) PCT No.: PCT/JP2014/067481
§ 371 (c)(1),
(2) Date: Dec. 28, 2015

(87) PCT Pub. No.: WO2015/002168
PCT Pub. Date: Jan. 8, 2015

(65) Prior Publication Data
US 2016/0129964 A1    May 12, 2016

(30) Foreign Application Priority Data
Jul. 1, 2013    (JP) ................. 2013-138484

(51) Int. Cl.
*B62K 5/10* (2013.01)
*B62K 5/05* (2013.01)
(Continued)

(52) U.S. Cl.
CPC ............... *B62K 5/10* (2013.01); *B60K 11/04* (2013.01); *B62J 23/00* (2013.01); *B62K 5/027* (2013.01);
(Continued)

(58) Field of Classification Search
CPC ... B62D 9/00; B62D 9/02; B62D 9/04; B62D 7/224; B60G 17/0162; B60G 17/08;
(Continued)

(56) References Cited

U.S. PATENT DOCUMENTS 2,990,215 A * 6/1961 May .................... B60J 5/103
16/248
4,088,199 A * 5/1978 Trautwein ............ B60G 21/007
180/209
(Continued)

FOREIGN PATENT DOCUMENTS

EP    2 347 949 A1    7/2011
EP    2 368 729 A1    9/2011
(Continued)

OTHER PUBLICATIONS

Official Communication issued in International Patent Application No. PCT/JP2014/067481, dated Aug. 12, 2014.
(Continued)

*Primary Examiner* — Barry Gooden, Jr.
(74) *Attorney, Agent, or Firm* — Keating and Bennett, LLP

(57) ABSTRACT

A fan generates an air flow that cools a portion of an engine unit. A ventilation opening causes air flow directed to the fan to pass therethrough. Under a condition that a body frame is in an upright state and a condition that a left front wheel and a right front wheel are not turned by a steering device, the ventilation opening is disposed directly behind a lower cover of an inner fender, ahead of a rear end of a rear wheel, on the right of a left end of the left front wheel, and on the left of a right end of the right front wheel.

6 Claims, 11 Drawing Sheets

(51) Int. Cl.
  *B62K 5/08* (2006.01)
  *B60K 11/04* (2006.01)
  *B62K 5/027* (2013.01)
  *B62J 23/00* (2006.01)
  *B62K 11/04* (2006.01)

(52) U.S. Cl.
  CPC ................ *B62K 5/05* (2013.01); *B62K 5/08* (2013.01); *B62K 11/04* (2013.01)

(58) Field of Classification Search
  CPC ............... B60G 21/05; B60G 2204/82; B60G 2204/8302; B60G 2300/12; B60G 2300/122; B60G 2300/45; B60G 2800/012; B62K 5/05; B62K 5/027; B62K 5/08; B62K 5/10; B62K 21/18; B62K 21/20; B62K 2700/22
  See application file for complete search history.

(56) References Cited

U.S. PATENT DOCUMENTS

| | | | | |
|---|---|---|---|---|
| 4,351,410 | A | * | 9/1982 | Townsend ................ B62D 9/02 180/210 |
| 4,740,004 | A | * | 4/1988 | McMullen ............... B62K 5/05 280/124.103 |
| 5,152,256 | A | | 10/1992 | Yamauchi et al. |
| 6,367,824 | B1 | * | 4/2002 | Hayashi ................... B62K 5/05 280/124.103 |
| 6,817,617 | B2 | * | 11/2004 | Hayashi ................... B62K 5/05 280/124.1 |
| D547,242 | S | | 7/2007 | Lambri |
| 7,264,251 | B2 | * | 9/2007 | Marcacci ........... B60G 17/0152 280/124.103 |
| D598,328 | S | | 8/2009 | Lambri |
| D656,435 | S | * | 3/2012 | Lambri ................. B62K 5/027 D12/110 |
| 9,758,215 | B2 | * | 9/2017 | Nagaya .................... B62M 7/12 |
| 2002/0007977 | A1 | * | 1/2002 | Ishii ........................ B62J 17/00 180/219 |
| 2002/0023795 | A1 | * | 2/2002 | Nagai ..................... B62K 11/04 180/219 |
| 2004/0112668 | A1 | * | 6/2004 | Rondeau ................ B62D 33/02 180/312 |
| 2005/0087376 | A1 | * | 4/2005 | Tsukada ................. B60K 6/383 180/65.25 |
| 2005/0167174 | A1 | * | 8/2005 | Marcacci ........... B60G 17/0152 180/76 |
| 2005/0167217 | A1 | * | 8/2005 | Marcacci ............. B60G 15/063 188/300 |
| 2006/0151232 | A1 | * | 7/2006 | Marcacci ............. B60G 21/007 180/414 |
| 2006/0185917 | A1 | * | 8/2006 | Ozeki .................... B60W 10/06 180/65.23 |
| 2007/0256882 | A1 | * | 11/2007 | Bedard .................. B62K 5/027 180/312 |
| 2008/0185205 | A1 | * | 8/2008 | Kaminokado ........... B60K 6/26 180/220 |
| 2010/0044977 | A1 | * | 2/2010 | Hughes ................ B60G 21/007 280/5.509 |
| 2010/0194068 | A1 | * | 8/2010 | Henderson ............... B62D 9/02 280/124.103 |
| 2011/0049205 | A1 | * | 3/2011 | Laperle ..................... B60R 9/02 224/425 |
| 2013/0019657 | A1 | | 1/2013 | Nakajima et al. |
| 2013/0168944 | A1 | * | 7/2013 | Bartolozzi ............... B60G 3/01 280/269 |
| 2014/0204598 | A1 | * | 7/2014 | Di Tanna ................. B60Q 1/12 362/460 |
| 2015/0291241 | A1 | * | 10/2015 | Takano .................... B62K 5/05 280/5.509 |
| 2015/0307149 | A1 | * | 10/2015 | Iizuka .................... B62K 19/38 280/267 |

FOREIGN PATENT DOCUMENTS

| | | |
|---|---|---|
| JP | 61-229683 A | 10/1986 |
| JP | 2-181017 A | 7/1990 |
| JP | 2010-228551 A | 10/2010 |
| JP | 2013-24100 A | 2/2013 |

OTHER PUBLICATIONS

Takano; "Vehicle"; U.S. Appl. No. 14/652,832, filed Jun. 17, 2015.
Sasaki et al.; "Vehicle"; U.S. Appl. No. 14/901,356, filed Dec. 28, 2015.

* cited by examiner

VEHICLE

BACKGROUND OF THE INVENTION

1. Field of the Invention

The present invention relates to a vehicle which includes a leanable body frame and two front wheels which are arranged side by side in a left-right direction of the body frame.

2. Description of the Related Art

A vehicle is known including a body frame which leans in a left-right direction of the vehicle when the vehicle turns to the left or the right and two front wheels which are arranged side by side in a left-right direction of the body frame (refer to U.S. Design Pat. D547,242S, for example). This type of vehicle is a vehicle which turns with its body frame leaning from a vertical direction. More specifically, the body frame leans to the right of the vehicle when the vehicle turns to the right, while when the vehicle turns to the left, the body frame leans to the left of the vehicle. In this type of vehicle, a distance between the two front wheels which are arranged side by side in the left-right direction of the body frame is very short, compared with a general four-wheeled vehicle, so as to ensure a large leaning quantity of the body frame. Consequently, this type of vehicle is compact in size in relation to the left-right direction of the body frame.

This type of vehicle includes an engine unit which includes an engine (an internal combustion engine) which produces a driving force by which the vehicle is driven. The vehicle described in U.S. Design Pat. D547,242S includes, as an engine unit, an engine and a heat radiator which dissipates heat produced by combustion in the engine. In the vehicle described in U.S. Design Pat. D547,242S, a ventilation opening is provided in a front surface of a front cover which covers at least a portion of a steering device. In addition, the heat radiator is disposed inside the front cover. In the vehicle described in U.S. Design Pat. D547,242S, air which the vehicle receives while the vehicle is running (that is, a flow of air produced around the circumference of the vehicle) is taken in from the ventilation opening to contact the heat radiator. The engine unit is cooled by the air so taken in.

In the case of the vehicle which includes the leanable body frame and the two front wheels which are arranged side by side in the left-right direction of the body frame, the front cover tends to be enlarged because a link mechanism which moves the two front wheels in an interlocked manner is accommodated in the front cover. Disposing the heat radiator in the front cover as described above while avoiding the interference thereof with the link mechanism enlarges the front cover, which results in the enlarged vehicle.

SUMMARY OF THE INVENTION

Preferred embodiments of the present invention cool an engine unit efficiently while reducing the size of a vehicle which includes a leanable body frame and two front wheels which are arranged side by side in a left-right direction of the body frame.

A preferred embodiment of the present invention is a vehicle including a body frame that leans to the left of the vehicle when the vehicle turns left, and that leans to the right of the vehicle when the vehicle turns right; a left front wheel and a right front wheel arranged side by side in a left-right direction of the body frame; a rear wheel disposed behind the left front wheel and the right front wheel in a front-rear direction of the body frame; a link mechanism that changes positions of the left front wheel and the right front wheel relative to the body frame to cause the body frame to lean to the left or to the right; a front cover covering at least a portion of the link mechanism; a steering device that turns the left front wheel and the right front wheel; an engine unit including an engine and disposed behind the left front wheel and the right front wheel in the front-rear direction of the body frame; an inner fender including a lower cover portion disposed behind rear ends of the left front wheel and the right front wheel in the front-rear direction of the body frame, disposed ahead of the engine unit in the front-rear direction of the body frame, and disposed below upper ends of the left front wheel and the right front wheel in an up-down direction of the body frame; a fan that generates, at least when the vehicle is running, an air flow to cool a portion of the engine unit and dissipate heat generated by the engine; and an ventilation opening that causes, at least when the vehicle is running, air flow directed to the fan to pass therethrough; wherein under a condition that the body frame is in an upright state and a condition that the left front wheel and the right front wheel are not turned by the steering device, the ventilation opening is disposed directly behind the lower cover portion in the front-rear direction of the body frame, disposed ahead of a rear end of the rear wheel, disposed on the right of a left end of the left front wheel in the left-right direction of the body frame, and disposed on the left of a right end of the right front wheel in the left-right direction of the body frame.

As described above, in the vehicle described in U.S. Design Pat. D547,242S, the ventilation opening that takes in air to cool the heat radiator which is the portion of the engine unit in the front surface of the front cover which covers at least a portion of the steering device. According this arrangement, since it is possible to receive head-on high-speed air flow which is generated in accordance with the traveling of the vehicle, it is reasonable from the viewpoint of efficiency to cool a portion of the engine unit by positively utilizing this air flow. Indeed, the inventor confirmed that a sufficient cooling effect for the engine unit is attained by the above arrangement.

However, the link mechanism that interlocks the two front wheels is accommodated within the front cover. In addition, since the heat radiator is accommodated within the front cover, the front cover is enlarged, thus the vehicle is enlarged. Further, since it is necessary to arrange the heat radiator so as to avoid the link mechanism, the degree of freedom in laying out the heat radiator and the ventilation opening is restricted.

Accordingly, the inventor considered a configuration which would efficiently cool the engine unit while making the vehicle small in size. Specifically, the air flow around the circumference of the vehicle was analyzed to investigate other positions from which the high-speed air flow could be efficiently taken in.

More specifically, the speed of air was analyzed which flows around the circumference of a vehicle while it is running, the vehicle including a body frame which leans to the left of the vehicle when the vehicle turns to the left and which leans to the right of the vehicle when the vehicle turns to the right, a left front wheel and a right front wheel which are arranged side by side in a left-right direction of the body frame, a rear wheel which is disposed behind the left front wheel and the right front wheel in a front-rear direction of the body frame, a link mechanism which changes positions of the left front wheel and the right front wheel to the body frame so as to cause the body frame to lean to the left or the right of the vehicle, a front cover which covers at least a portion of the link mechanism, a steering device which turns the left front wheel and the right front wheel, an engine unit which includes an engine and which is disposed behind the left front wheel and the right front wheel in the front-rear direction of the body frame, and an inner fender including a lower cover portion which is disposed behind respective rear end portions of the left front wheel and the right front wheel in the front-rear direction of the body frame, directly ahead of the engine unit in the front-rear direction of the body frame, and below respective upper ends of the left front wheel and the right front wheel in an up-down direction of the body frame.

As a result, the inventor discovered that areas where the speed of an air flow is relatively fast are present directly behind the lower cover portion in the front-rear direction of the body frame, on the left of a left end of the left front wheel and on the right of a right end of the right front wheel (that is, positions which are located relatively far away from a center of the vehicle in relation to the left-right direction of the body frame) in such a state that the body frame is in the upright state and the left front wheel and the right front wheel are not turned by the steering device. However, attempting to provide a construction to take in high-speed air flows which are present in those areas cannot avoid enlarging the vehicle in the left-right direction of the body frame.

On the other hand, the inventor discovered that areas where the speed of an air flow is relatively slow are present directly behind the lower cover portion in the front-rear direction of the body frame, ahead of a rear end of the rear wheel in the front-rear direction of the body frame, on the right of the left end of the left front wheel in the left-right direction of the body frame, and on the left of the right end of the right front wheel in the left-right direction of the body frame in such a state that the body frame is in the upright state and the left front wheel and the right front wheel are not turned by the steering device.

Areas where the speed of an air flow is relatively slow are also areas where atmospheric pressure is relatively high. Then, approaching the above problems differently, the inventor discovered that air is able to be taken in efficiently by providing a fan in those areas to produce a pressure difference.

Based on this discovery, the inventor arranged the fan so that an air flow is produced to cool a portion of the engine unit while the vehicle is running. Further, the inventor located the ventilation opening, which allows air flow directed toward the fan to pass therethrough during the vehicle is running, directly behind the lower cover portion in the front-rear direction of the body frame, ahead of the rear end of the rear wheel in the front-rear direction of the body frame, on the right of the left end of the left front wheel in the left-right direction of the body frame, and on the left of the right end of the right front wheel in the left-right direction of the body frame in such a state that the body frame is in the upright state and the left front wheel and the right front wheel are not turned by the steering device.

According to this configuration, air is guided efficiently from the ventilation opening to the portion of the engine unit by making use of the pressure difference produced by driving the fan. Further, in such a state that the body frame is in the upright state and the left front wheel and the right front wheel are not turned by the steering device, the areas present directly behind the lower cover portion in the front-rear direction of the body frame, ahead of the rear end of the rear wheel in the front-rear direction of the body frame, on the right of the left end of the left front wheel in the left-right direction of the body frame, and on the left of the right end of the right front wheel in the left-right direction of the body frame extend over a relatively wide range. Because of this, it is possible to ensure a high degree of freedom in laying out the engine unit, the fan, and the ventilation opening. Further, since the construction to take in an air flow does not have to be provided so as to project in a left-right direction of the vehicle, the size of the vehicle is able to be significantly reduced. Consequently, the engine unit is able to be cooled efficiently while reducing the size of the vehicle which includes the leanable body frame and the two front wheels which are arranged side by side in the left-right direction of the body frame.

The vehicle is preferably configured such that the engine unit includes a radiator, and the radiator is disposed such that the air flow having passed through the ventilation opening comes into contact with the radiator.

According to this configuration, the water-cooled engine unit is cooled efficiently while reducing the size of the vehicle which includes the leanable body frame and the two front wheels which are arranged side by side in the left-right direction of the body frame.

The vehicle is preferably configured such that the radiator is disposed such that the air flow directed to the fan passes through the radiator.

Since there is a tendency that the air pressure becomes higher near the radiator, according to the above configuration, air containing heat dissipated from the radiator is guided efficiently toward the fan by a pressure difference which is caused by the fan which is disposed on a downstream side of the radiator. Consequently, the engine unit is cooled efficiently while reducing the size of the vehicle which includes the leanable body frame and the two front wheels which are arranged side by side in the left-right direction of the body frame.

The vehicle is preferably configured such that the engine is disposed such that the air flow having passed through the ventilation opening comes into contact with the engine.

According to this configuration, the engine, which is a heat source, is cooled efficiently. Consequently, the engine unit is cooled efficiently while reducing the size of the vehicle which includes the leanable body frame and the two front wheels which are arranged side by side in the left-right direction of the body frame.

The vehicle is preferably configured such that the fan is disposed such that the air flow directed to the engine passes through the fan.

According to this configuration, an air flow which is produced by driving the fan is supplied to the engine, which is the heat source, with high efficiency. Consequently, the engine unit is cooled efficiently while reducing the size of the vehicle which includes the leanable body frame and the two front wheels which are arranged side by side in the left-right direction of the body frame.

The vehicle is preferably configured such that the ventilation opening intersects with the left-right direction of the body frame.

Also in this configuration, air is taken in efficiently to cool a portion of the engine unit by making use of the pressure difference which is produced by driving the fan. In other words, the necessity of providing a construction to positively receive the air flow which flows from the front to the rear of the vehicle at the left or the right of the vehicle is eliminated or reduced. Consequently, the engine unit is cooled efficiently while further reducing the size of the vehicle which includes the leanable body frame and the two front wheels which are arranged side by side in the left-right direction of the body frame.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
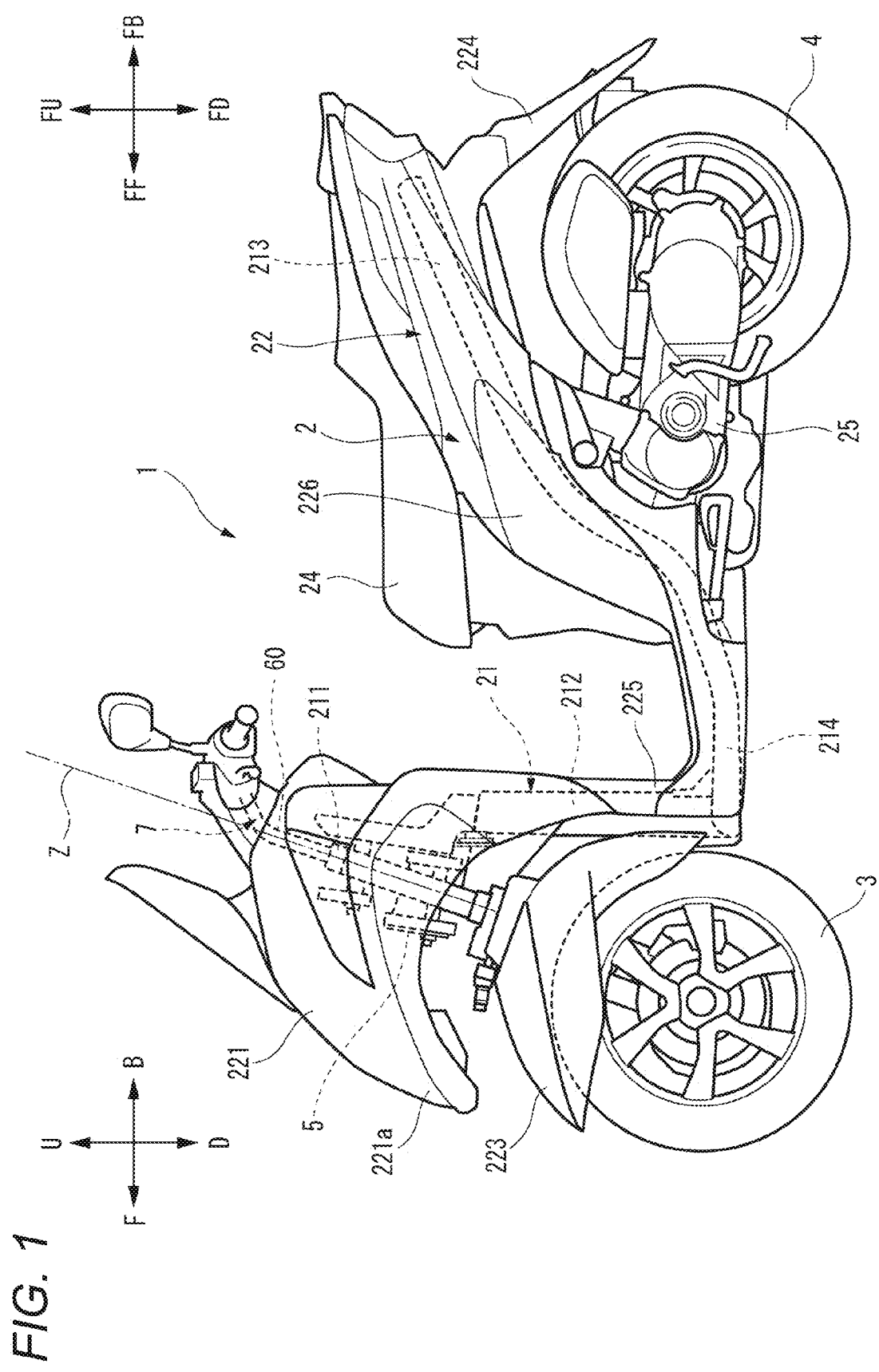
FIG. 1 is a side view of the whole a vehicle according to a preferred embodiment of the present invention, viewed from the left thereof.

Referring to the accompanying drawings, examples of preferred embodiments of the present invention will be described in detail below.

In the accompanying drawings, an arrow F denotes a front or forward direction of a vehicle. An arrow B denotes a back/rear or backward/rearward direction of the vehicle. An arrow U denotes an up or upward direction of the vehicle. An arrow D denotes a down or downward direction of the vehicle. An arrow R denotes a right or rightward direction of the vehicle. An arrow L denotes a left or leftward direction of the vehicle.

A vehicle turns with a body frame leaning in a left-right direction of the vehicle relative to a vertical direction. Accordingly, in addition to the directions based on the vehicle, directions based on the body frame will be defined. In the accompanying drawings, an arrow FF denotes a front or forward direction of the body frame. An arrow FB denotes a back/rear or backward/rearward of the body frame. An arrow FU denotes an up or upward direction of the body frame. An arrow FD denotes a down or downward direction of the body frame. An arrow FR denotes a right or rightward direction of the body frame. An arrow FL denotes a left or leftward direction of the body frame.

In this description, a "front-rear direction of the body frame," a "left-right direction of the body frame," and an "up-down direction of the body frame" mean a front-rear direction, a left-right direction, and an up-down direction based on the body frame as viewed from a rider who rides the vehicle. "A side of or sideways of the body frame" means directly on the right or left of the body frame.

In this description, an expression "something extends in the front-rear direction of the body frame" includes a situation in which something extends while being inclined in relation to the front-rear direction of the body frame and means that something extends with a gradient which is closer to the front-rear direction of the body frame rather than the left-right direction and the up-down direction of the body frame.

In this description, an expression "something extends in the left-right direction of the body frame" includes a situation in which something extends while being inclined in relation to the left-right direction of the body frame and means that something extends with a gradient which is closer to the left-right direction of the body frame rather than the front-rear direction of the body frame and the up-down direction of the body frame.

In this description, an expression "something extends in the up-down direction of the body frame" includes a situation in which something extends while being inclined in relation to the up-down direction of the body frame and means that something extends with a gradient which is closer to the up-down direction of the body frame rather than the front-rear direction of the body frame and the left-right direction of the body frame.

In this description, an expression the "body frame is in the upright state" means that the up-down direction of the body frame coincides with the vertical direction in such a state that the vehicle is not steered. In this state, the directions based on the vehicle and the directions based on the vehicle frame coincide. When the vehicle is turning with the body frame leaning in the left-right direction relative to the vertical direction, the left-right direction of the vehicle does not coincide with the left-right direction of the body frame. Additionally, the up-and-down direction of the vehicle does not coincide with the up-and-down direction of the body frame, too. However, the front-rear direction of the vehicle coincides with the front-rear direction of the body frame.

Referring to FIGS. 1 to 9, a vehicle 1 according to various preferred embodiments of the invention will be described. The vehicle 1 is a vehicle which is driven by power generated from a power source and which includes a leanable body frame and two front wheels which are arranged side by side in the left-right direction of the body frame.

FIG. 1 is a left side view wherein the whole of the vehicle 1 is viewed from the left thereof. The vehicle 1 includes a vehicle main body 2, a pair of left and right front wheels 3, a rear wheel 4, a link mechanism 5, and a steering device 7.

The vehicle main body 2 includes a body frame 21, a body cover 22, a seat 24, and an engine unit 25. In FIG. 1, the body frame 21 is in an upright state. The following description which refers to FIG. 1 will be made on the premise that the body frame 21 is in the upright state.

The body frame 21 includes a head pipe 211, a down frame 212, and a rear frame 213. In FIG. 1, portions of the body frame 21 which are hidden by the body cover 22 are shown by dashed lines. The body frame 21 supports the seat 24 and the engine unit 25. The engine unit 25 supports the rear wheel 4. The engine unit 25 includes a power source such as an engine, an electric motor, a battery or the like and a device such as a transmission. The power source produces a force by which the vehicle 1 is driven.

The head pipe 211 is disposed at a front portion of the vehicle 1. When the body frame 21 is viewed from the left thereof, an upper portion of the head pipe 211 is disposed behind a lower portion of the head pipe 211.

The down frame 212 is connected to the head pipe 211. The down frame 212 is disposed directly behind the head pipe 211. The down frame 212 extends in the up-down direction of the body frame 21.

The rear frame 213 is disposed directly behind the down frame 212. The rear frame 213 extends in the front-rear direction of the body frame 21. The rear frame 213 supports the seat 24 and the engine unit 25.

The body cover 22 includes a front cover 221, a pair of left and right front fenders 223, a rear fender 224, and an inner fender 225. The body cover 22 covers at least partially body portions which are mounted on the vehicle 1 such as the pair of left and right front wheels 3, the body frame 21, the link mechanism 5 and the like.

The front cover 221 is disposed ahead of the seat 24. The front cover 221 covers at least partially the link mechanism 5 and the steering device 7.

At least portions of the pair of left and right front fenders 223 are disposed directly below the front cover 221. At least the portions of the pair of left and right front fenders 223 are disposed directly above the pair of left and right front wheels 3, respectively.

At least a portion of the rear fender 224 is disposed directly above the rear wheel 4.

The inner fender 225 is disposed in a position where the leg shield 225 covers at least partially legs of the rider. The inner fender 225 is disposed behind the pair of left and right front wheels 3 and ahead of the seat 24.

At least portions of the pair of left and right front wheels 3 are disposed directly below the head pipe 211. At least portions of the pair of left and right front wheels 3 are disposed directly below the front cover 221.

At least a portion of the rear wheel 4 is disposed below the seat 24. At least a portion of the rear wheel 4 is disposed directly below the rear fender 224.

Figure 2:
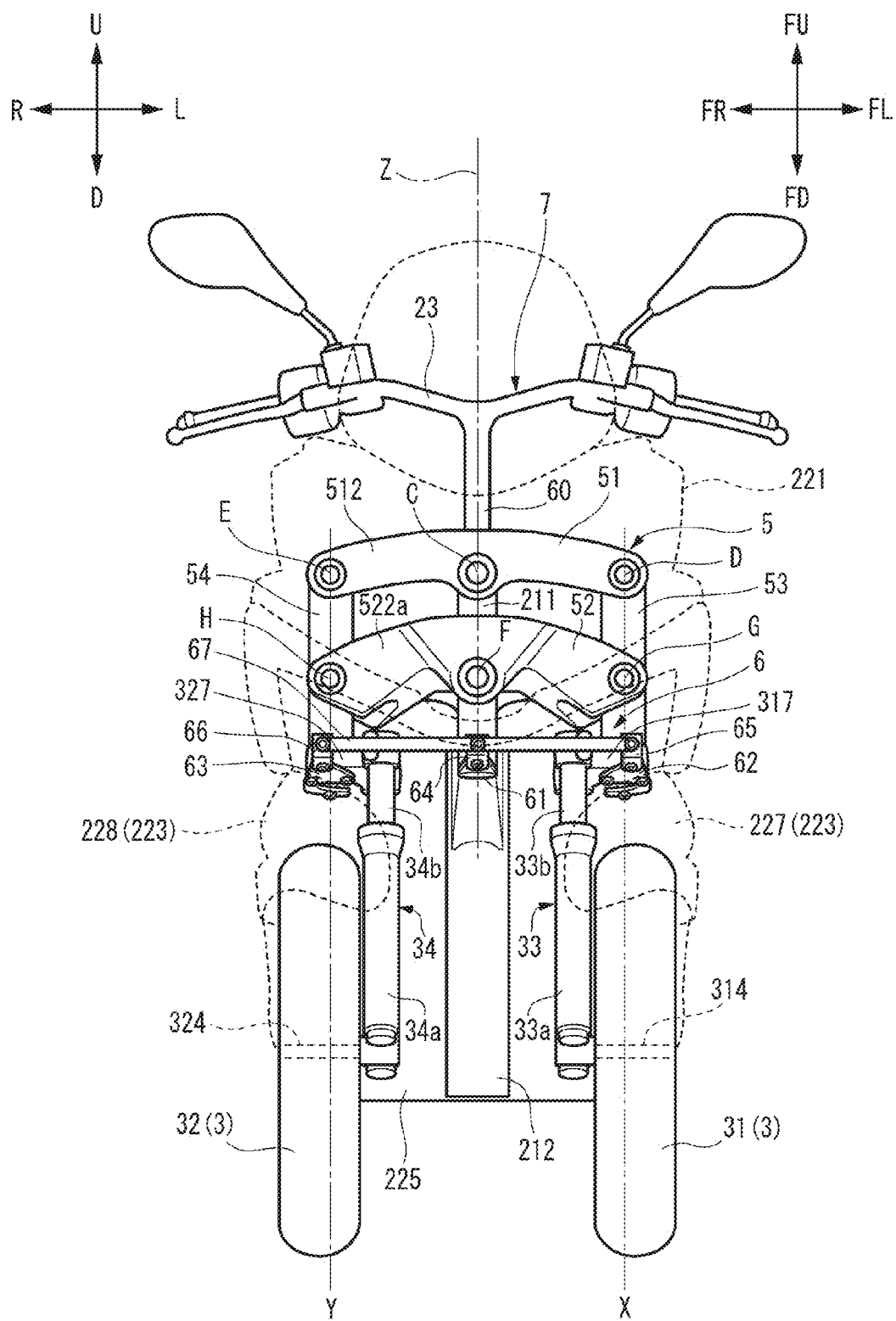
FIG. 2 is a front view showing a front portion of the vehicle of FIG. 1.

FIG. 2 is a front view of the front portion of the vehicle 1 as viewed from the front of the body frame 21. In FIG. 2, the body frame 21 is in the upright state. The following description which refers to FIG. 2 will be made on the premise that the body frame 21 is in the upright state. In FIG. 2, those elements shown therein are depicted as being seen through the front cover 221 and the pair of left and right front fenders 223 which are shown by dashed lines.

The pair of left and right front wheels 3 includes a left front wheel 31 and a right front wheel 32. The left front wheel 31 is disposed on the left of the head pipe 211 which defines a portion of the body frame 21. The right front wheel 32 is disposed on the right of the head pipe 211. The left front wheel 31 and the right front wheel 32 are disposed so as to be arranged side by side in the left-right direction of the body frame 21.

The steering device 7 includes a left shock absorbing mechanism 33, a right shock absorbing mechanism 34, a left bracket 317, and a right bracket 327.

The left shock absorbing mechanism 33 includes a left outer tube 33a. The left outer tube 33a supports the left front wheel 31. The left outer tube 33a extends in the up-down direction of the body frame 21. The left outer tube 33a includes a left supporting axle 314 at a lower end portion thereof. The left front wheel 31 is supported by the left supporting axle 314.

The left shock absorbing mechanism 33 includes a left inner tube 33b. The left inner tube 33b extends in the up-down direction of the body frame 21. The left inner tube 33b is disposed directly above the left outer tube 33a in such a state that a portion of the left inner tube 33b is inserted in the left outer tube 33a. An upper portion of the left inner tube 33b is fixed to the left bracket 317.

The left shock absorbing mechanism 33 preferably is a so-called telescopic shock absorbing mechanism. The left inner tube 33b moves relatively to the left outer tube 33a in a direction in which the left outer tube 33a extends, so that the left shock absorbing mechanism 33 is allowed to extend and contract in the extending direction of the left outer tube 33a. This enables the left shock absorbing mechanism 33 to absorb a displacement of the left front wheel 31 relative to the left inner tube 33b in the up-down direction of the body frame 21.

The left outer tube 33a and the left inner tube 33b define a pair of telescopic elements which are arranged side by side in the front-rear direction of the body frame 21.

The right shock absorbing mechanism 34 includes a right outer tube 34a. The right outer tube 34a supports the right front wheel 32. The right outer tube 34a extends in the up-down direction of the body frame 21. The right outer tube 34a includes a right supporting axle 324 at a lower end portion thereof. The right front wheel 32 is supported by the right supporting axle 324.

The right shock absorbing mechanism 34 includes a right inner tube 34b. The right inner tube 34b extends in the up-down direction of the body frame 21. The right inner tube 34b is disposed directly above the right outer tube 34a in such a state that portion thereof is inserted in the right outer tube 34a. An upper portion of the right inner tube 34b is connected to a right bracket 327.

The right shock absorbing mechanism 34 preferably is a so-called telescopic shock absorbing mechanism. The right inner tube 34b moves relatively to the right outer tube 34a in a direction in which the right outer tube 34a extends, so that the right shock absorbing mechanism 34 is allowed to extend and contract in the extending direction of the right outer tube 34a. This enables the right shock absorbing mechanism 34 to absorb a displacement of the right front wheel 32 relative to the right inner tube 34b in the up-down direction of the body frame 21.

The right outer tube 34a and the right inner tube 34b define a pair of telescopic elements which are arranged side by side in the front-rear direction of the body frame 21.

The steering device 7 includes a steering force transmitting mechanism 6. The steering force transmitting mechanism 6 includes a handlebar 23 and a steering shaft 60. The handlebar 23 is attached to an upper portion of the steering shaft 60. A portion of the steering shaft 60 is turnably supported on the head pipe 211. A central turning axis Z of the steering shaft 60 extends in the up-down direction of the body frame 21. As shown in FIG. 1, the upper portion of the steering shaft 60 is disposed behind a lower portion thereof. Consequently, the central turning axis Z of the steering shaft 60 is inclined in the front-rear direction of the body frame 21. The steering shaft 60 turns about the central turning axis Z in response to the rider operating the handlebar 23.

The steering force transmitting mechanism 6 transmits a steering force with which the rider operates the handlebar 23 to the left bracket 317 and the right bracket 327. A specific configuration thereof will be described in detail below.

In the vehicle 1 according to the present preferred embodiment, the link mechanism 5 preferably uses a four parallel joint link system (also referred to as a parallelogram link).

As shown in FIG. 2, the link mechanism 5 is disposed below the handlebar 23. The link mechanism 5 is disposed above the left front wheel 31 and the right front wheel 32. The link mechanism 5 includes an upper cross member 51, a lower cross member 52, a left side member 53, and a right side member 54. The link mechanism 5 never turns about the central turning axis Z relative to the body frame 21 irrespective of the turning of the steering shaft 60 turns about the central turning axis Z in association with the operation of the handlebar 23.

The upper cross member 51 includes a plate member 512. The plate member 512 is disposed directly ahead of the head pipe 211. The plate member 512 extends in the left-right direction of the body frame 21.

An intermediate portion of the upper cross member 51 is supported on the head pipe 211 by a support portion C. The upper cross member 51 turns relative to the head pipe 211 about an intermediate upper axis which passes through the support portion C and extends in the front-rear direction of the body frame 21.

A left end portion of the upper cross member 51 is supported on the left side member 53 by a support portion D. The upper cross member 51 turns relative to the left side member 53 about a left upper axis which passes through the support portion D and extends in the front-rear direction of the body frame 21.

A right end portion of the upper cross member 51 is supported on the right side member 54 by a support portion E. The upper cross member 51 turns relative to the right side member 54 about a right upper axis which passes through the support portion E and extends in the front-rear direction of the body frame 21.

Figure 3:
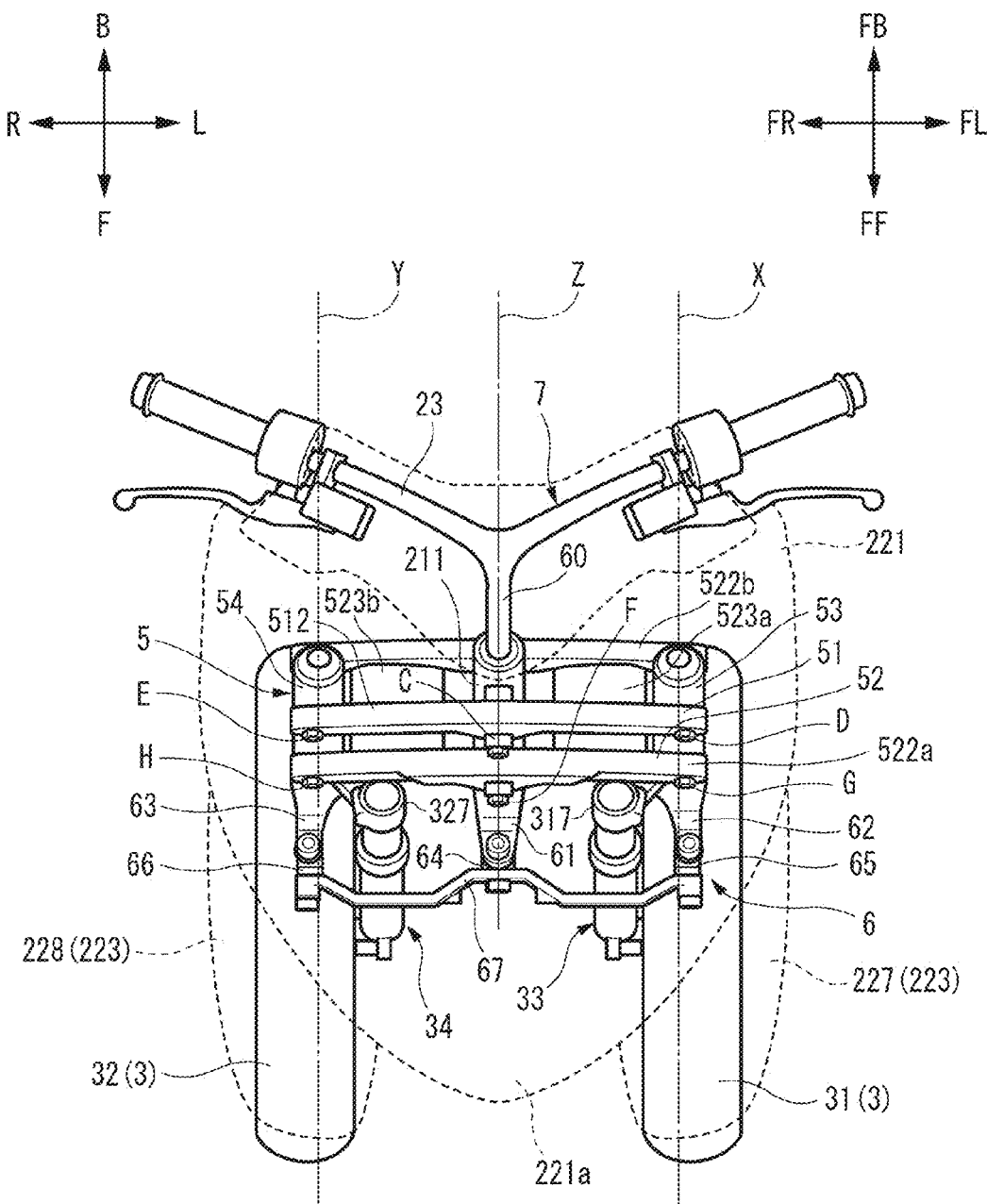
FIG. 3 is a plan view showing the front portion of the vehicle of FIG. 1.

FIG. 3 is a plan view of the front portion of the vehicle 1 as viewed from the above the body frame 21. In FIG. 3, the body frame 21 is in the upright state. The following description which refers to FIG. 3 will be made on the premise that the body frame 21 is in the upright state. In FIG. 3, those elements shown therein are depicted as being seen through the front cover 221 and the pair of front fenders 223 which are shown by dashed lines.

As shown in FIG. 3, the lower cross member 52 includes a front plate member 522*a* and a rear plate member 522*b*. The front plate member 522*a* is disposed directly ahead of the head pipe 211. The rear plate member 522*b* is disposed directly behind the head pipe 211. The front plate member 522*a* and the rear plate member 522*b* extend in the left-right direction of the body frame 21. The front plate member 522*a* and the rear plate member 522*b* are connected together by the left connecting block 523*a* and the right connecting block 523*b*. The left connecting block 523*a* is disposed on the left of the head pipe 211. The right connecting block 523*b* is disposed on the right of the head pipe 211.

The lower cross member 52 is disposed below the upper cross member 51. A lengthwise dimension of the lower cross member 52 in relation to the left-right direction of the body frame 21 is exactly or almost the same as a lengthwise dimension of the upper cross member 51 in relation to the left-right direction of the body frame 21. The lower cross member 52 extends parallel to the upper cross member 51.

An intermediate portion of the lower cross member 52 is supported on the head pipe 211 by a support portion F. The lower cross member 52 turns about an intermediate lower axis which passes through the support portion F and extends in the front-rear direction of the body frame 21.

A left end portion of the lower cross member 52 is supported on the left side member 53 by a support portion G. The lower cross member 52 turns about a left lower axis which passes through the support portion G and extends in the front-rear direction of the body frame 21.

A right end portion of the lower cross member 52 is supported on the right side member 54 by a support portion H. The lower cross member 52 turns about a right lower axis which passes through the support portion H and extends in the front-rear direction of the body frame 21.

The intermediate upper axis, the right upper axis, the left upper axis, the intermediate lower axis, the right lower axis, and the left lower axis extend parallel to one another. The intermediate upper axis, the right upper axis, the left upper axis, the intermediate lower axis, the right lower axis, and the left lower axis are disposed above the left front wheel 31 and the right front wheel 32.

As shown in FIGS. 2 and 3, the left side member 53 is disposed directly on the left of the head pipe 211. The left side member 53 is disposed above the left front wheel 31. The left side member 53 extends in a direction in which the head pipe 211 extends. The left side member 53 extends in a direction in which the central turning axis Z of the steering shaft 60 extends. An upper portion of the left side member 53 is disposed behind a lower portion thereof.

The lower portion of the left side member 53 is connected to the left bracket 317. The left bracket 317 turns about a left center axis X relative to the left side member 53. The left center axis X extends in a direction in which the left side member 53 extends. As shown in FIG. 2, the left center axis X extends parallel to the central turning axis Z of the steering shaft 60 in the up-down direction of the body frame 21. As shown in FIG. 3, the left center axis X extends parallel to the central turning axis Z of the steering shaft 60 in the front-rear direction of the body frame 21.

As shown in FIGS. 2 and 3, the right side member 54 is disposed directly on the right of the head pipe 211. The right side member 54 is disposed above the right front wheel 32. The right side member 54 extends in the direction in which the head pipe 211 extends. The right side member 54 extends in the direction in which the central turning axis Z of the steering shaft 60 extends. An upper portion of the right side member 54 is disposed behind a lower portion thereof.

A lower portion of the right side member 54 is connected to the right bracket 327. The right bracket 327 turns about a right center axis Y relative to the right side member 54. The right center axis Y extends in a direction in which the right side member 54 extends. As shown in FIG. 2, the right center axis Y extends parallel to the central turning axis Z of the steering shaft 60 in the up-down direction of the body frame 21. As shown in FIG. 3, the right center axis Y extends parallel to the central turning axis Z of the steering shaft 60 in the front-rear direction of the body frame 21.

Thus, as has been described above, the upper cross member 51, the lower cross member 52, the left side member 53, and the right side member 54 are supported on the body frame 21 so that the upper cross member 51 and the lower cross member 52 are held in postures which are parallel to each other and so that the left side member 53 and the right side member 54 are held in postures which are parallel to each other.

As shown in FIGS. 2 and 3, the steering force transmitting mechanism 6 includes, in addition to the handlebar 23 and the steering shaft 60 which have been described above, an intermediate transmission plate 61, a left transmission plate 62, a right transmission plate 63, an intermediate joint 64, a left joint 65, a right joint 66, and a tie rod 67.

The intermediate transmission plate 61 is connected to the lower portion of the steering shaft 60. The intermediate transmission plate 61 cannot turn relatively to the steering shaft 60. The intermediate transmission plate 61 turns about the intermediate turning axis Z of the steering shaft 60 relative to the head pipe 211. A front portion of the intermediate transmission plate 61 is narrower in relation to a width in the left-right direction of the body frame 21 than a rear portion thereof.

The left transmission plate 62 is disposed directly on the left of the intermediate transmission plate 61. The left transmission plate 62 is connected to a lower portion of the left bracket 317. The left transmission plate 62 cannot turn relative to the left bracket 317. The left transmission plate 62 turns about the left center axis X relative to the left side member 53. A front portion of the left transmission plate 62 is narrower in relation to a width in the left-right direction of the body frame 21 than a rear portion thereof.

The right transmission plate 63 is disposed directly on the right of the intermediate transmission plate 61. The right transmission plate 63 is connected to a lower portion of the right bracket 327. The right transmission plate 63 cannot turn relatively to the right bracket 327. The right transmission plate 63 turns about the right center axis Y relative to the right side member 54. A front portion of the right transmission plate 63 is narrower in relation to a width in the left-right direction of the body frame 21 than a rear portion thereof.

As shown in FIG. 3, the intermediate joint 64 is connected to the front portion of the intermediate transmission plate 61 via a shaft which extends in the up-down direction of the body frame 21. The intermediate transmission plate 61 and the intermediate joint 64 turn relatively about the shaft portion. The left joint 65 is disposed directly on the left of the intermediate joint 64. The left joint 65 is connected to the front portion of the left transmission plate 62 via a shaft which extends in the up-down direction of the body frame. The left transmission plate 62 and the left joint 65 turn relatively about the shaft portion. The right joint 66 is disposed directly on the right of the intermediate joint 64. The right joint 66 is connected to the front portion of the right transmission plate 63 via a shaft which extends in the up-down direction of the body frame. The right transmission plate 63 and the right joint 66 turn relatively about the shaft portion.

A shaft portion which extends in the front-rear direction of the body frame 21 is provided at a front portion of the intermediate joint 64. A shaft portion which extends in the front-rear direction of the body frame 21 is provided at a front portion of the left joint 65. A shaft portion which extends in the front-rear direction of the body frame 21 is provided at a front portion of the right joint 66. The tie rod 67 extends in the left-right direction of the body frame 21. The tie rod 67 is connected to the intermediate joint 64, the left joint 65, and the right joint 66 via those shaft portions. The tie rod 67 and the intermediate joint 64 turn relatively about the shaft portion which is provided at the front portion of the intermediate joint 64. The tie rod 67 and the left joint 65 turn relatively about the shaft portion which is provided at the front portion of the left joint 65. The tie rod 67 and the right joint 66 turn relatively about the shaft portion which is provided at the front portion of the right joint 66.

Figure 4:
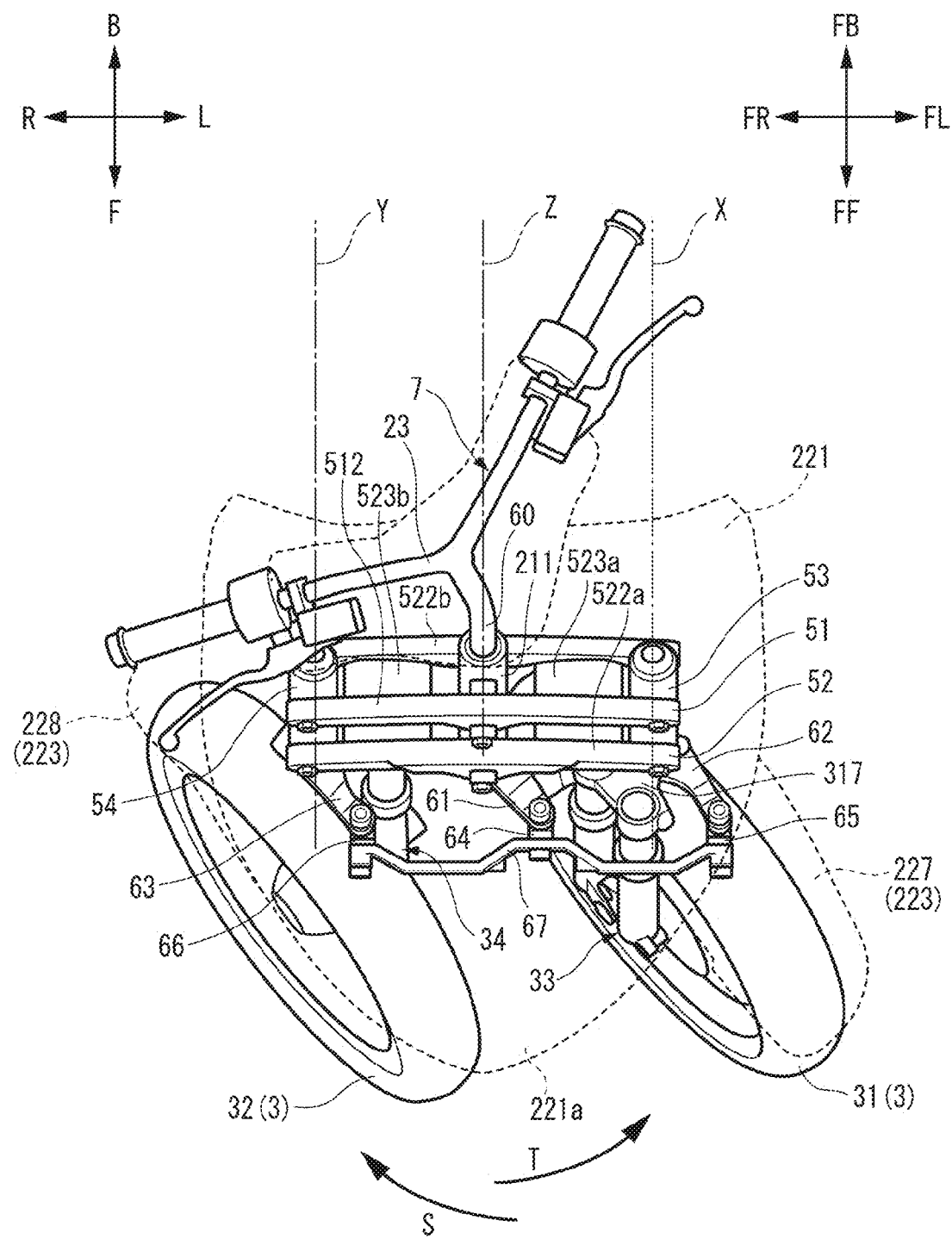
FIG. 4 is a plan view showing the front portion of the vehicle shown in FIG. 1 when the vehicle is steered.

Next, referring to FIGS. 3 and 4, a steering operation of the vehicle 1 will be described. FIG. 4 is a plan view of the front portion of the vehicle 1 under a condition that the left front wheel 31 and the right front wheel 32 are turned to the left, as viewed from the above the body frame 21. In FIG. 4, those elements shown therein are depicted as being seen through the front cover 221 and the pair of front fenders 223 which are shown by dashed lines.

When the rider operates the handlebar 23, the steering shaft 60 turns about the central turning axis Z relative to the head pipe 211. When the handlebar 23 is turned to the left as shown in FIG. 4, the steering shaft 60 turns in a direction indicated by an arrow T. In association with the turning of the steering shaft 60, the intermediate transmission plate 61 turns in the direction indicated by the arrow T about the central turning axis Z relative to the head pipe 211.

In association with the turning of the intermediate transmission plate 61 in the direction indicated by the arrow T, the intermediate joint 64 of the tie rod 67 turns relative to the intermediate transmission plate 61 in a direction indicated by an arrow S. This moves the tie rod 67 rightwards and rearwards with its posture maintained as it is.

In association with the rightward and rearward movement of the tie rod 67, the left joint 65 and the right joint 66 of the tie rod 67 turn in the direction indicated by the arrow S relative to the left transmission plate 62 and the right transmission plate 63, respectively. This causes the left transmission plate 62 and the right transmission plate 63 to turn in the direction indicated by the arrow T while the tie rod 67 maintains its posture as it is.

When the left transmission plate 62 turns in the direction indicated by the arrow T, the left bracket 317, which cannot turn relative to the left transmission plate 62, turns in the direction indicated by the arrow T about the left center axis X relative to the left side member 53.

When the right transmission plate 63 turns in the direction indicated by the arrow T, the right bracket 327, which cannot turn relative to the right transmission plate 63, turns in the direction indicated by the arrow T about the right center axis Y relative to the right side member 54.

When the left bracket 317 turns in the direction indicated by the arrow T, the left shock absorbing mechanism 33, which is connected to the left bracket 317 via the left inner tube 33b, turns in the direction indicated by the arrow T about the left center axis X relative to the left side member 53. When the left shock absorbing mechanism 33 turns in the direction indicated by the arrow T, the left front wheel 31, which is supported on the left shock absorbing mechanism 33 via the left supporting axle 314, turns in the direction indicated by the arrow T about the left center axis X relative to the left side member 53.

When the right bracket 327 turns in the direction indicated by the arrow T, the right shock absorbing mechanism 34, which is connected to the right bracket 327 via the right inner tube 34b, turns in the direction indicated by the arrow T about the right center axis Y relative to the right side member 54. When the right shock absorbing mechanism 34 turns in the direction indicated by the arrow T, the right front wheel 32, which is supported on the right shock absorbing mechanism 34 via the right supporting axle 324, turns in the direction indicated by the arrow T about the right center axis Y relative to the right side member 54.

When the rider operates the handlebar 23 so as to turn to the right, the elements described above turn in the direction indicated by the arrow S. Since the elements move the other way around in relation to the left-right direction, the detailed description thereof will be omitted here.

Thus, as has been described above, the steering force transmitting mechanism 6 transmits the steering force to the left front wheel 31 and the right front wheel 32 in response to the operation of the handlebar 23 by the rider. The left front wheel 31 and the right front wheel 32 turn about the left center axis X and the right center axis Y, respectively, in the direction corresponding to the direction in which the handlebar 23 is operated by the rider.

Figure 5:
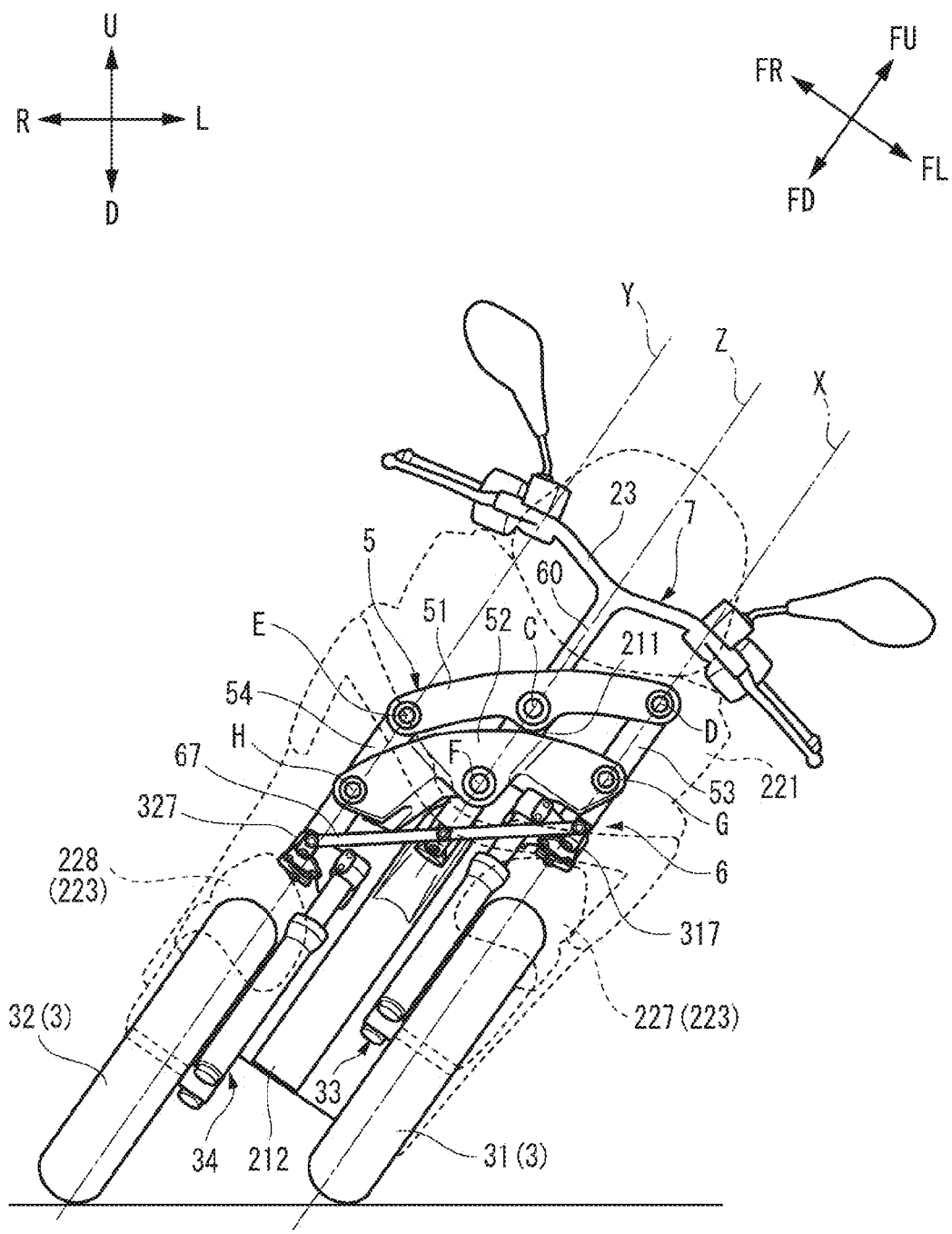
FIG. 5 is a front view showing the front portion of the vehicle shown in FIG. 1 when the vehicle is caused to lean.

Next, referring to FIGS. 2 and 5, a leaning operation of the vehicle 1 will be described. FIG. 5 is a front view of the front portion of the vehicle 1 as viewed from the front of the body frame 21 when the body frame 21 leans to the left of the vehicle 1. In FIG. 5, those elements shown therein are depicted as being seen through the front cover 221 and the pair of front fenders 223 which are shown by dashed lines.

As shown in FIG. 2, when the body frame 21 is in the upright state, when the vehicle 1 is viewed from the front of the body frame 21, the link mechanism 5 preferably has a rectangular or substantially rectangular shape. As shown in FIG. 5, with the body frame 21 leaning, when the vehicle 1 is viewed from the front of the body frame 21, the link mechanism 5 has a parallelogram shape. The deformation of the link mechanism 5 is associated with the leaning of the body frame 21 in the left-right direction of the vehicle 1. The operation of the link mechanism 5 means that the upper cross member 51, the lower cross member 52, the left side member 53 and the right side member 54 which define the link mechanism 5 turn relatively about the turning axes which pass through the corresponding support portions C to H, so that the shape of the link mechanism 5 changes.

For example, as shown in FIG. 5, when the rider causes the vehicle 1 to lean to the left, the head pipe 211 leans to the left from the vertical direction. When the head pipe 211 leans, the upper cross member 51 turns about the intermediate upper axis which passes through the support portion C counterclockwise as viewed from the front of the vehicle 1 relative to the head pipe 211. Similarly, the lower cross member 52 turns about the intermediate lower axis which passes through the support portion F counterclockwise as viewed from the front of the vehicle 1 relative to the head pipe 211. This causes the upper cross member 51 to move to the left relative to the lower cross member 52.

As the upper cross member 51 moves to the left, the upper cross member 51 turns about the left upper axis which passes through the support portion D and the right upper axis which passes through the support portion E counterclockwise as viewed from the front of the vehicle 1 relative to the left side member 53 and the right side member 54, respectively. Similarly, the lower cross member 52 turns about the left lower axis which passes through the support portion G and the right lower axis which passes through the support portion H counterclockwise as viewed from the front of the vehicle 1 relative to the left side member 53 and the right side member 54, respectively. This causes the left side member 53 and the right side member 54 to lean to the left from the vertical direction while holding their postures parallel to the head pipe 211.

As this occurs, the lower cross member 52 moves to the left relative to the tie rod 67. As the lower cross member 52 moves to the left, the shaft portions which are provided at the respective front portions of the intermediate joint 64, the left joint 65 and the right joint 66 turn relative to the tie rod 67. This allows the tie rod 67 to hold a parallel posture to the upper cross member 51 and the lower cross member 52.

As the left side member 53 leans to the left, the left bracket 317 which is connected to the left side member 53 leans to the left. As the left bracket 317 leans to the left, the left shock absorbing mechanism 33 which is connected to the left bracket 317 leans to the left. As the left shock absorbing mechanism 33 leans to the left, the left front wheel 31 supported on the left shock absorbing mechanism 33 leans to the left while holding its posture parallel to the head pipe 211.

As the right side member 54 leans to the left, the right bracket 327 which is connected to the right side member 54 leans to the left. As the right bracket 327 leans to the left, the right shock absorbing mechanism 34 which is connected to the right bracket 327 leans to the left. As the right shock absorbing mechanism 34 leans to the left, the right front wheel 32 supported on the right shock absorbing mechanism 34 leans to the left while holding its posture parallel to the head pipe 211.

The leaning operations of the left front wheel 31 and the right front wheel 32 are described based on the vertical direction. However, when the vehicle 1 leans (when the link mechanism 5 is activated to operate), the up-down direction of the body frame 21 does not coincide with the vertical direction. In the event that the leaning operations are described based on the up-down direction of the body frame 21, when the link mechanism 5 is activated to operate, the relative positions of the left front wheel 31 and the right front wheel 32 to the body frame 21 change. In other words, the link mechanism 5 changes the relative positions of the left front wheel 31 and the right front wheel 32 to the body frame 21 in the up-down direction of the body frame 21 to cause the body frame 21 to lean relative to the vertical direction.

When the rider causes the vehicle 1 to lean to the right, the elements lean to the right. Since the elements move the other way around in relation to the left-right direction, the detailed description thereof will be omitted here.

Figure 6:
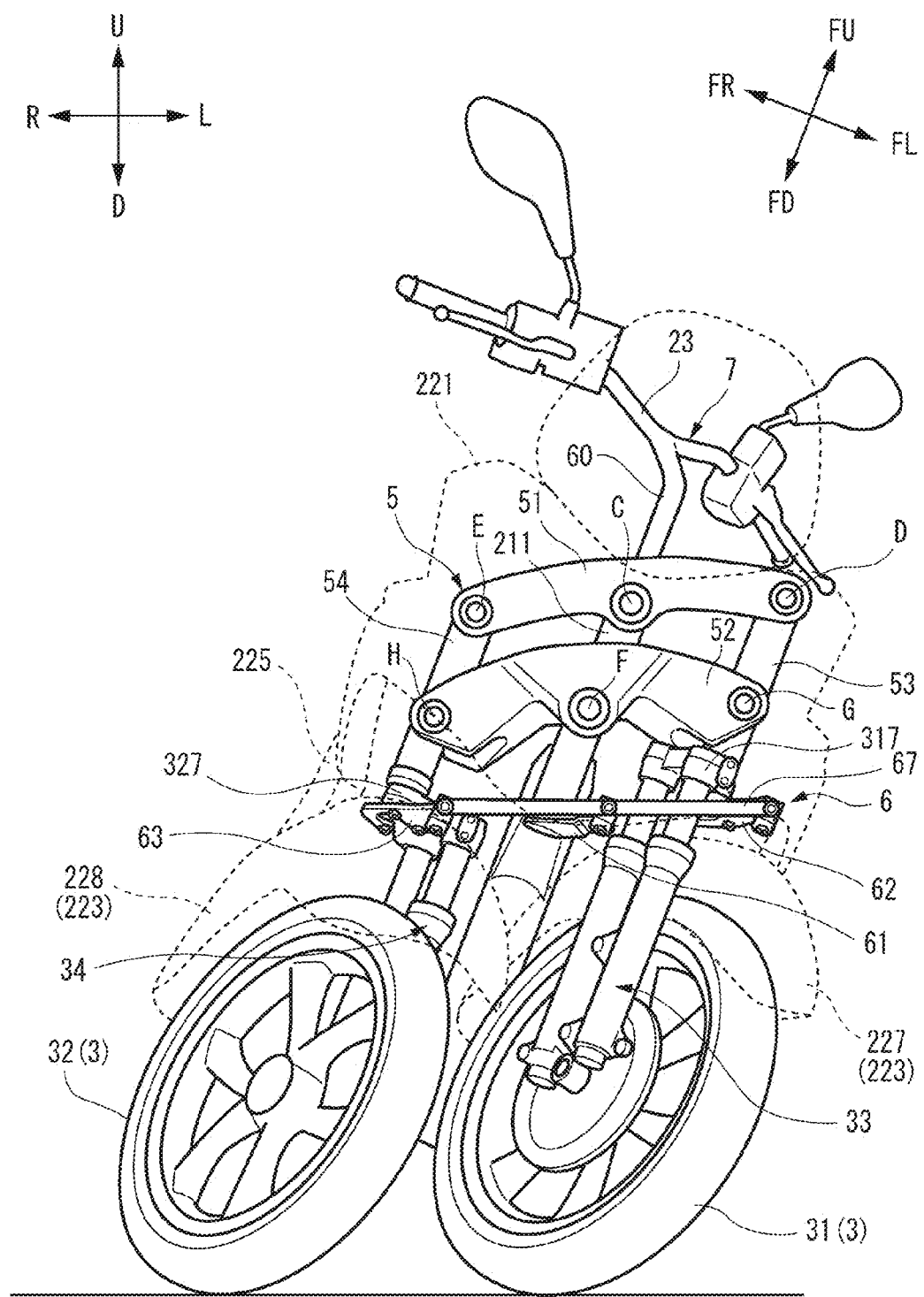
FIG. 6 is a front view showing the front portion of the vehicle shown in FIG. 1 when the vehicle is caused to lean and is steered.

FIG. 6 is a front view of the front portion of the vehicle with the vehicle 1 caused to lean and be steered. FIG. 6 shows a state that the vehicle 1 is steered or turned to the left while leaning to the left. As a result of this steering operation, the left front wheel 31 and the right front wheel 32 are turned to the left, and as a result of the leaning operation, the left front wheel 31 and the right front wheel 32 lean to the left together with the body frame 21. Namely, in this state, the link mechanism 5 exhibits the parallelogram shape, and the tie rod 67 moves toward the left rear from its position which it takes when the body frame 21 is in the upright state.

Figure 7A:
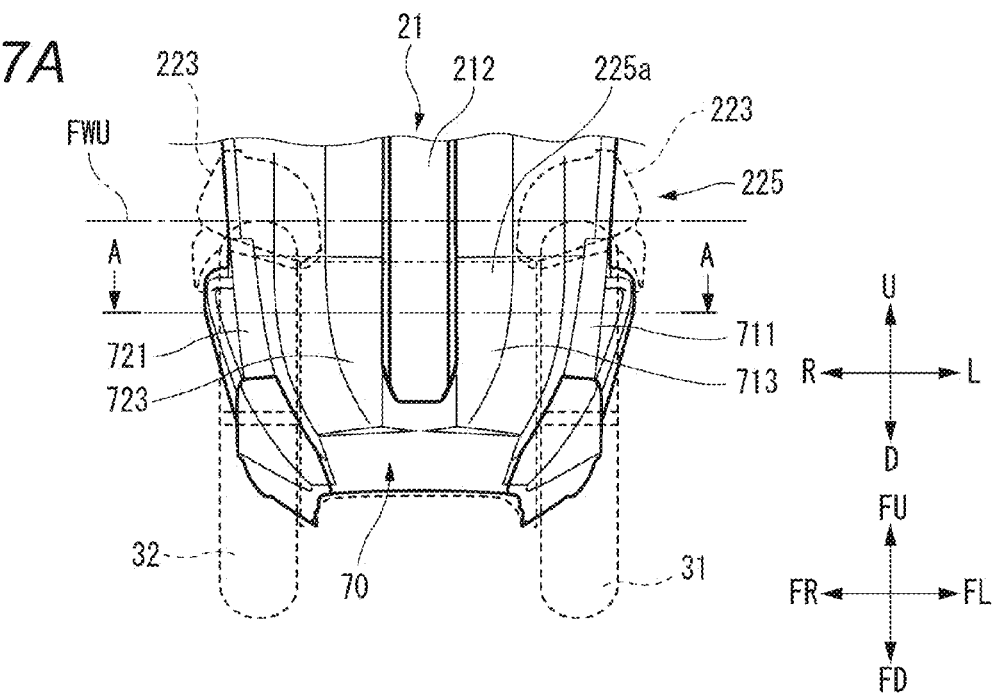
FIGS. 7A and 7B are views for explaining an inner fender included in the vehicle of FIG. 1.
Figure 7B:
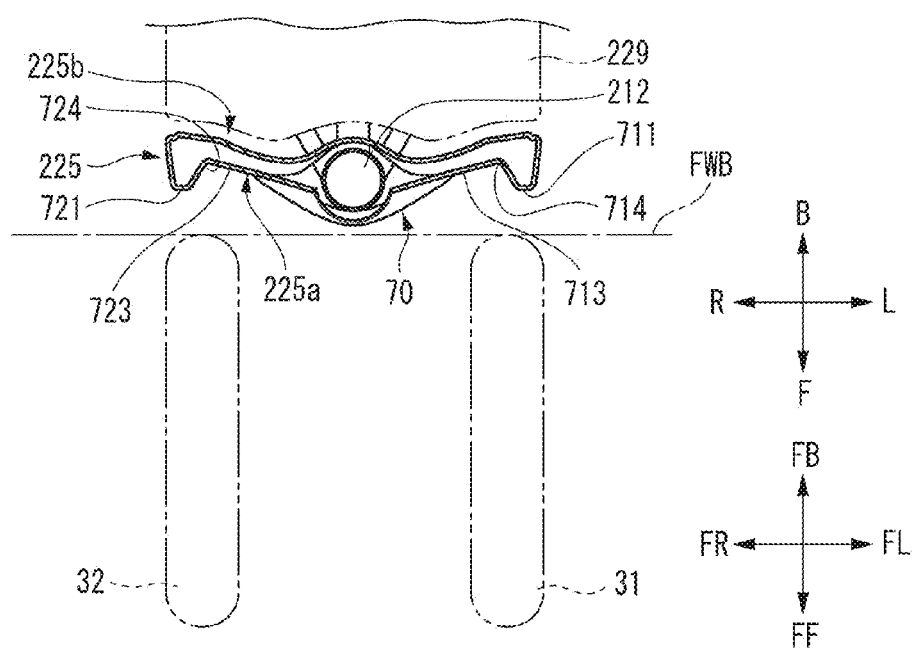

Next, referring to FIGS. 7A and 7B, a specific shape of the inner fender 225 of the vehicle 1 will be described. FIG. 7A is a front view of a portion of the inner fender 225 as viewed from the front of the vehicle 1. FIG. 7B is a sectional view taken along a line A-A shown FIG. 7A. In FIGS. 7A and 7B, the body frame 21 is in the upright state. The following description which refers to FIGS. 7A and 7B will be made on the premise that the body frame 21 is in the upright state. In FIG. 7A, those elements shown therein are depicted as being seen through the left front wheel 31, the right front wheel 32, and the pair of left and right front fenders 223. In FIG. 7B, positions corresponding to the left front wheel 31, the right front wheel 32, and the inner fender 225 are shown by dashed lines.

The inner fender 225 is mounted on the down frame 212 which is a portion of the body frame 21. The inner fender 225 includes a front cover 225a and a rear cover 225b. The front cover 225a extends in the up-down direction of the body frame 21 along the down frame 212. The rear cover 225b is disposed behind the down frame 212 in the front-rear direction of the body frame 21. The rear cover 225b extends in the up-down direction of the body frame 21 along the down frame 212.

The inner fender 225 is disposed behind the left front wheel 31 and the right front wheel 32 in the front-rear direction of the body frame 21. The inner fender 225 is disposed ahead of the engine unit 25 in the front-rear direction of the body frame 21. The inner fender 225 is disposed ahead of a foot rest portion 229 in the front-rear direction of the body frame 21. The foot rest portion 229 is where the feet of the rider rest (only the position of which is indicated by dashed chain lines).

The inner fender 225 includes a lower cover portion 70. The lower cover portion 70 is disposed behind, in the front-rear direction of the body frame 21, respective rear end portions FWB of the left front wheel 31 and the right front wheel 32 which are not steered by the steering device 7. The lower cover portion 70 is disposed below respective upper ends FWU of the left front wheel 31 and the right front wheel 32 in the up-down direction of the body frame 21.

The lower cover portion 70 includes a left front surface portion 713 and a right front surface portion 723. The left front surface portion 713 is disposed on the left of the down frame 212 in the left-right direction of the body frame 21. The right front surface portion 723 is disposed on the right of the down frame 212 in the left-right direction of the body frame 21.

The lower cover portion 70 includes a left projecting portion 711 and a right projecting portion 721. The left projecting portion 711 and the right projecting portion 721 project forward in the front-rear direction of the body frame 21. The left projecting portion 711 extends in the up-down direction of the body frame 21, and a lower portion thereof is curved rightward in the left-right direction of the body frame 21. The right projecting portion 721 extends in the up-down direction of the body frame 21, and a lower portion thereof is curved toward the left in the left-right direction of the body frame 21.

The left front surface portion 713 extends in such a way as to incline rearward in the front-rear direction of the body frame 21 as it extends leftward in the left-right direction of the body frame 21. The left front surface portion 713 is connected to the left projecting portion 711 at a left connecting portion 714. The right front surface portion 723 extends in such a way as to incline rearward in the front-rear direction of the body frame 21 as it extends rightward in the left-right direction of the body frame 21. The right front surface portion 723 is connected to the right projecting portion 721 at a right connecting portion 724.

Figure 8:
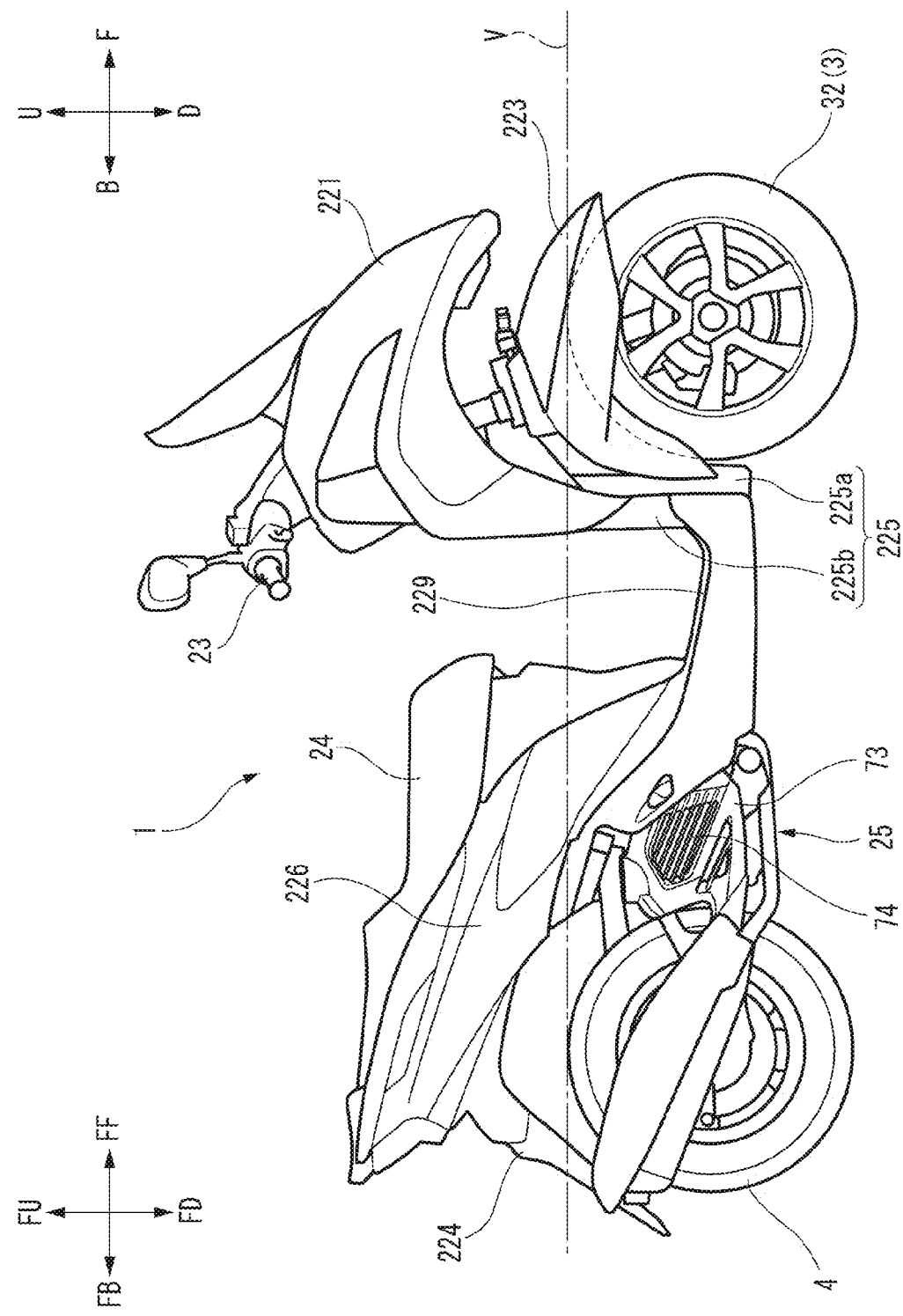
FIG. 8 is a side view of the whole of the vehicle of FIG. 1, viewed from the right thereof.
Figure 9:
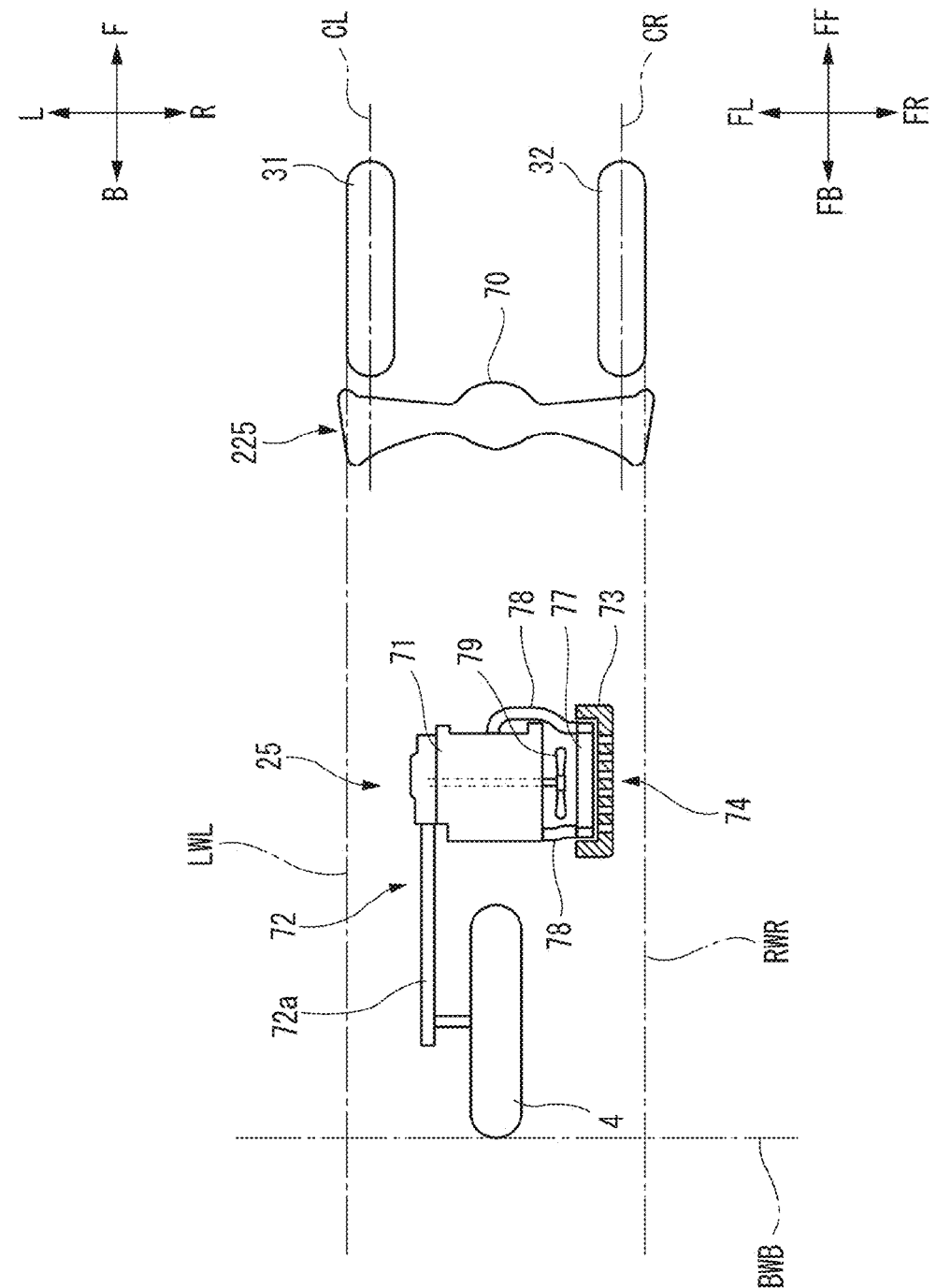
FIG. 9 is a view schematically showing a positional relationship among elements disposed in a lower portion of the vehicle of FIG. 1.

Next, referring to FIGS. 8 and 9, the engine unit 25 of the vehicle 1 will be described. FIG. 8 is a right side view of an external appearance of the vehicle 1 as viewed from the right thereof. FIG. 9 schematically shows a positional relationship among elements disposed in a lower portion of the vehicle 1 which is below a chain line V in FIG. 8. The chain line V is a line which connects the upper end of the front wheel 3 with an upper end of the rear wheel 4. FIGS. 8 and 9 show a state that the body frame 21 is in the upright state and the left front wheel 31 and the right front wheel 32 are not turned by the steering device 7. When referred to herein, the "state that the left front wheel 31 and the right front wheel 32 are not turned" means a state that the orientation of a straight line CL which passes through a front end and a rear end of the left front wheel 31 and the orientation of a straight line CR which passes through a front end and a rear end of the right front wheel 32 shown in FIG. 9 coincide with the front-to-rear direction of the body frame 21. In other words, the "state that the left front wheel 31 and the right front wheel 32 are not turned" is the state of the left front wheel 31 and the right front wheel 32 when the vehicle travels straight ahead. However, this state does not define whether the vehicle is moving or is stopped. This state includes not only a case where the vehicle is moving but also a case where the vehicle is stopped. The following description which refers to FIGS. 8 and 9 will be made based on this state.

As shown in FIG. 9, the engine unit 25 is disposed behind the left front wheel 31 and the right front wheel 32 in the front-rear direction of the body frame 21. The engine unit 25 includes the engine 71 and the power transmission unit 72. The engine 71 produces a driving force by which the vehicle 1 is driven. The power transmission unit 72 connects the engine 71 with the rear wheel 4. The power transmission unit 72 includes a speed changing mechanism 72a as a power transmission mechanism. A belt, a chain or the like may be used as the power transmission mechanism of the power transmission unit 72. The power transmission unit 72 transmits a driving force of the engine 71 to the rear wheel 4. The vehicle 1 travels as a result of the driving force of the engine 71 being transmitted to the rear wheel 4 by the power transmission unit 72. The engine unit 25 is supported on the body frame 21 in such a way as to move in the up-down direction of the body frame 21.

As shown in FIG. 9, the vehicle 1 includes a fan 79. The fan 79 produces an air flow which dissipates heat produced from the engine 71 by cooling a portion of the engine unit 25 while the vehicle 1 is running. As the fan 79, an appropriate fan may be an axial fan, a centrifugal fan (a sirocco fan, a turbo fan), a mixed flow fan, and a cross flow fan. The fan 79 may be a mechanical fan which rotates based on the driving force of the engine 71 or an electric fan which is driven by a supply of electric power.

As shown in FIGS. 8 and 9, the vehicle 1 includes a ventilation opening 74. The ventilation opening 74 is provided so as to allow an air flow directed toward the fan 79 to pass therethrough while the vehicle 1 is running. As shown in FIG. 9, the ventilation opening 74 is disposed directly behind the lower cover portion 70 of the inner fender 225 in the front-rear direction of the body frame 21, ahead of a rear end BWB of the rear wheel 4 in the front-rear direction of the body frame 21, on the right of, in the left-right direction of the body frame 21, a left end LWL of the left front wheel 31 which is not turned by the steering device 7, and on the left of, in the left-right direction of the body frame 21, a right end RWR of the right front wheel 32 which is not turned by the steering device 7.

The reason that the ventilation opening 74 is disposed in the way described above will be described.

As described above, in the vehicle described in U.S. Design Pat. D547,242S, the ventilation opening that takes in air to cool the heat radiator, which is a portion of the engine unit, is provided in a front surface of the front cover which covers at least a portion of the steering device. According this arrangement, since it is possible receive head-on high-speed air flow which is generated in accordance with the traveling of the vehicle, it is reasonable from the viewpoint of efficiency to cool a portion of the engine unit by positively utilizing this air flow. Indeed, the inventor confirmed that a sufficient cooling effect for the engine unit is attained by the above arrangement.

However, the link mechanism that interlocks the two front wheels is accommodated within the front cover. In addition, since the heat radiator is accommodated within the front cover, the front cover is enlarged, so that the vehicle is enlarged. Further, since it is necessary to arrange the heat radiator so as to avoid the link mechanism, the degree of freedom in laying out the heat radiator and the ventilation opening is restricted.

Then, the inventor studied configurations to cool the engine unit 25 efficiently while reducing the size of the vehicle 1. Specifically, the air flow around the circumference of the vehicle 1 was analyzed to investigate other positions from which high-speed air flow may be taken in efficiently.

More specifically, the speed of air was analyzed which flows around the circumference of the vehicle 1 while it is running, the vehicle including a body frame 21 which leans to the left of the vehicle 1 when the vehicle 1 turns to the left and which leans to the right of the vehicle 1 when the vehicle 1 turns to the right, a left front wheel 31 and a right front wheel 32 which are arranged side by side in a left-right direction of the body frame 21, a rear wheel 4 which is disposed behind the left front wheel 31 and the right front wheel 32 in a front-rear direction of the body frame 21, a link mechanism 5 which changes relative positions of the left front wheel 31 and the right front wheel 32 to the body frame 21 so as to cause the body frame 21 to lean to the left or the right of the vehicle 1, a front cover 221 which covers at least a portion of the link mechanism 5, a steering device 7 which turns the left front wheel 31 and the right front wheel 32, an engine unit 25 which includes an engine 71 and which is disposed behind the left front wheel 31 and the right front wheel 32 in the front-rear direction of the body frame 21, and an inner fender 225 including a lower cover portion 70 which is disposed behind respective rear end portions FWB of the left front wheel 31 and the right front wheel 32 in the front-rear direction of the body frame 21, directly ahead of the engine unit 25 in the front-rear direction of the body frame 21, and below respective upper ends FWU of the left front wheel 31 and the right front wheel 32 in an up-down direction of the body frame 21.

Figure 10A:
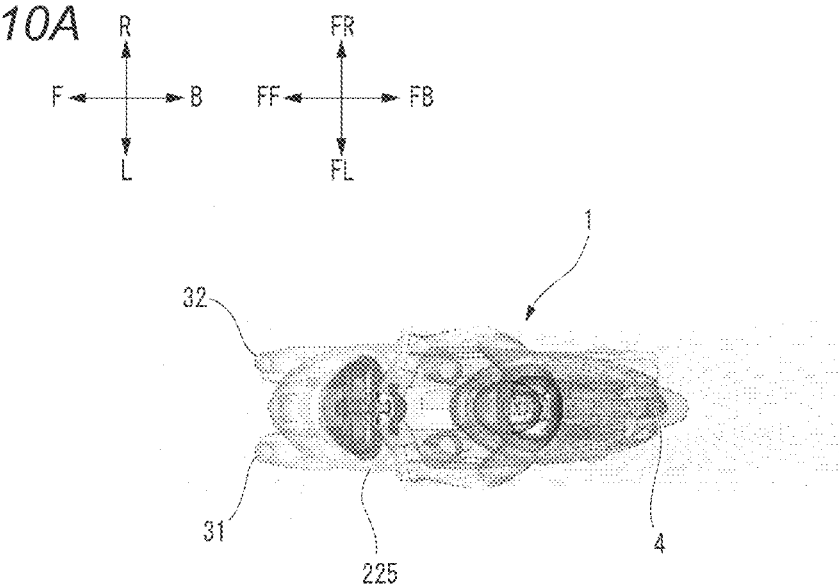
FIGS. 10A and 10B are views showing speeds of air which flow around the circumference of the vehicle of FIG. 1 when the vehicle is running.
Figure 10B:
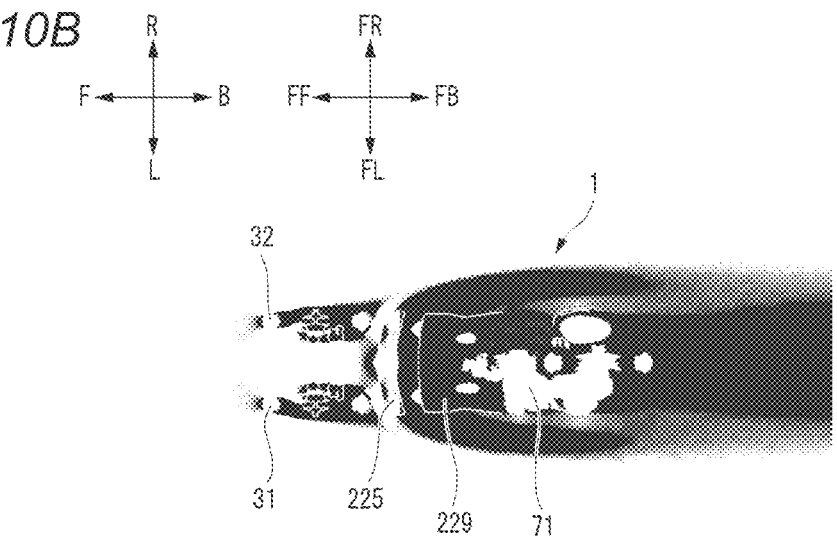

FIGS. 10A and 10B show the results of the inventor's analysis. FIG. 10A shows speeds of air which flow around the circumference of the vehicle 1 in a height-wise position which is almost as high as the waist of the rider in the up-down direction of the body frame 21. FIG. 10B shows speeds of air which flow around the circumference of a lower portion (that is, below the line V in FIG. 8) of the vehicle 1. Portions which are darker in color indicate that the speed of the air flow is slower.

Figure 11A:
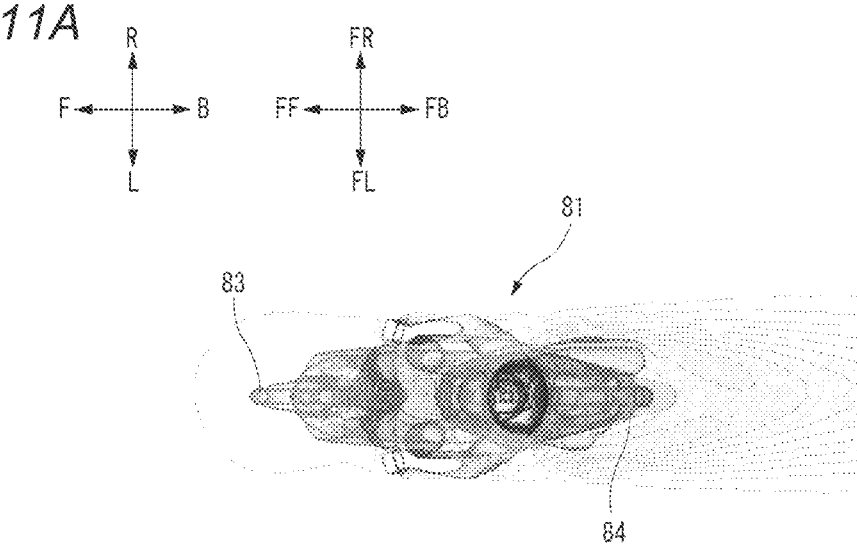
FIGS. 11A and 11B are views showing speeds of air which flow around the circumference of a vehicle according to a comparative example when the vehicle is running.
Figure 11B:
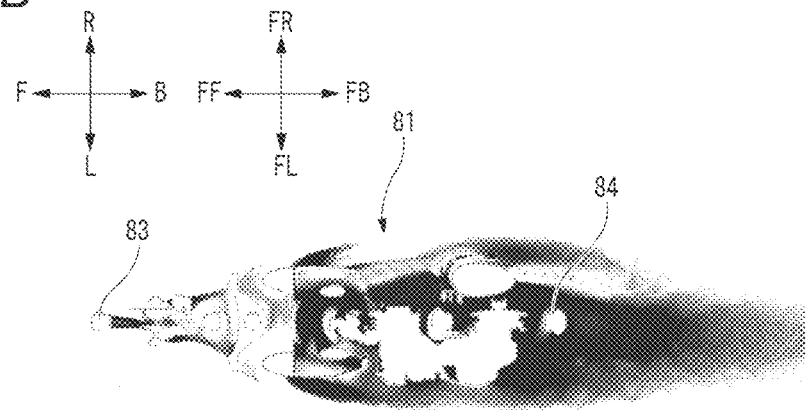

FIGS. 11A and 11B show the results of the inventor's analysis of speeds of air which flow around the circumference of a vehicle 81 as a comparative example when the vehicle 81 is running. The vehicle 81 preferably is a motorcycle which includes a front wheel 83 and a rear wheel 84, for example. FIGS. 11A and 11B show speeds of air which flow around the circumference of the vehicle 81 at a height corresponding to that described in FIGS. 10A and 10B. Portions which are darker in color indicate that the speed of the air flow is slower.

As a result, the inventor discovered that areas where the speed of an air flow is relatively fast are present directly behind the lower cover portion 70 in the front-rear direction of the body frame 21, on the left of a left end LWL of the left front wheel 31 and on the right of a right end RWR of the right front wheel 32 (that is, positions which are located relatively far away from a center of the vehicle in relation to the left-right direction of the body frame 21) in such a state that the body frame 21 is in the upright state and the left front wheel 31 and the right front wheel 32 are not turned by the steering device 7. However, attempting to provide a construction that takes in high-speed air flows which are present in those areas cannot avoid enlarging the vehicle 1 in the left-right direction of the body frame 21.

On the other hand, the inventor discovered that areas where the speed of an air flow is relatively slow are present directly behind the lower cover portion 70 in the front-rear direction of the body frame 21, ahead of a rear end BWB of the rear wheel 4 in the front-rear direction of the body frame 21, on the right of the left end LWL of the left front wheel 31 in the left-right direction of the body frame 21, and on the left of the right end RWR of the right front wheel 32 in the left-right direction of the body frame 21 in such a state that the body frame 21 is in the upright state and the left front wheel 31 and the right front wheel 32 are not turned by the steering device 7.

Areas where the speed of the air flow is relatively slow are also areas where the atmospheric pressure is relatively high. Then, approaching the problems described above differently, the inventor discovered that air is able to be taken in efficiently by providing the fan 79 in those areas thereby producing a pressure difference.

Based on this discovery, the inventor configured the fan 79 so that an air flow is produced to cool a portion of the engine unit 25 while the vehicle 1 is running. Further, the inventor disposed the ventilation opening 74, which allows air flow directed toward the fan 79 to pass therethrough when the vehicle 1 is running, directly behind the lower cover portion 70 in the front-rear direction of the body frame 21, ahead of the rear end BWB of the rear wheel 4 in the front-rear direction of the body frame 21, on the right of the left end LWL of the left front wheel 31 in the left-right direction of the body frame 21, and on the left of the right end RWR of the right front wheel 32 in the left-right direction of the body frame 21 in such a state that the body frame 21 is in the upright state and the left front wheel 31 and the right front wheel 32 are not turned by the steering device 7.

According to this configuration, air is guided efficiently from the ventilation opening 74 to the portion of the engine unit 25 by using the pressure difference produced by the driving of the fan 79. Further, in such a state that the body frame 21 is in the upright state and the left front wheel 31 and the right front wheel 32 are not turned by the steering device 7, the areas present directly behind the lower cover portion 70 in the front-rear direction of the body frame 21, ahead of the rear end BWB of the rear wheel 4 in the front-rear direction of the body frame 21, on the right of the left end LWL of the left front wheel 31 in the left-right direction of the body frame 21, and on the left of the right end RWR of the right front wheel 32 in the left-right direction of the body frame 21 extend over a relatively wide range. Because of this, it is possible to ensure a high degree of freedom in laying out the engine unit 25, the fan 79, and the ventilation opening 74. Further, since the construction for taking in an air flow does not have to be provided so as to project in a left-right direction of the vehicle 1, the size of the vehicle 1 is able to be significantly reduced. Consequently, the engine unit 25 is cooled efficiently while reducing the size of the vehicle 1 which includes the leanable body frame 21 and the two front wheels 3 which are arranged side by side in the left-right direction of the body frame 21.

As shown in FIG. 9, in the vehicle 1 according to the present preferred embodiment, the engine unit 25 includes a radiator 77 and a radiator hose 78. The radiator 77 is disposed near the engine 71. The radiator hose 78 connects the radiator 77 with the engine 71. The radiator 77 is filled with a coolant (water or the like) which cools the engine 71. The coolant circulates between the radiator 77 and the engine 71 by way of the radiator hose 78, so that the engine 71 is cooled. The radiator 77 executes a heat exchange between the coolant and air so as to dissipate heat in the coolant. Namely, the engine unit 25 according to the present preferred embodiment is a water-cooled unit.

As shown in FIGS. 8 and 9, the vehicle 1 includes a radiator cover 73. The radiator cover 73 covers the radiator 77. The ventilation opening 74 described above is provided in the radiator cover 73. The radiator 77 is disposed so that the air flow which has passed through the ventilation opening 74 is brought into contact therewith.

According to this configuration, the water-cooled engine unit 25 is cooled efficiently while reducing the size of the vehicle 1 which includes the leanable body frame 21 and the two front wheels 3 which are arranged side by side in the left-right direction of the body frame 21.

More specifically, as shown in FIG. 9, the radiator 77 is disposed in a position through which the air flow directed toward the fan 79 passes.

Since there is a tendency that the air pressure becomes higher near the radiator 77, air containing heat dissipated from the radiator 77 is guided efficiently toward the fan 79 by a pressure difference caused by the fan 79 which is disposed on a downstream side of the radiator 77. Consequently, the engine unit 25 is cooled efficiently while reducing the size of the vehicle 1 which includes the leanable body frame 21 and the two front wheels 3 which are arranged side by side in the left-right direction of the body frame 21.

In the present preferred embodiment, as shown in FIG. 9, the engine 71 is disposed so that the air flow which has passed through the ventilation opening 74 is brought into contact with the engine 71.

According to this configuration, the engine 71, which is a heat source, is cooled efficiently. Consequently, the engine unit 25 is cooled efficiently while reducing the size of the vehicle 1 which includes the leanable body frame 21 and the two front wheels 3 which are arranged side by side in the left-right direction of the body frame 21.

More specifically, the fan 79 is disposed in a position through which the air flow directed toward the engine 71 passes.

According to this configuration, an air flow which is produced by driving the fan 79 is supplied to the engine 71, which is a heat source, with high efficiency. Consequently, the engine unit 25 is cooled efficiently while reducing the size of the vehicle 1 which includes the leanable body frame 21 and the two front wheels 3 which are arranged side by side in the left-right direction of the body frame 21.

In the present preferred embodiment, as shown in FIGS. 8 and 9, the ventilation opening 74 intersects the left-right direction of the body frame 21.

Also in this configuration, air is taken in efficiently to cool a portion of the engine unit 25 by using the pressure difference which is produced by driving the fan 79. In other words, the necessity to provide a construction that positively receives the air flow which flows from the front to the rear of the vehicle 1 at the left or the right of the vehicle 1 is eliminated or reduced. Consequently, the engine unit 25 is cooled efficiently while further reducing the size of the vehicle 1 which includes the leanable body frame 21 and the two front wheels 3 which are arranged side by side in the left-right direction of the body frame 21.

The preferred embodiments described heretofore are intended to facilitate the understanding of the present invention and are not intended to limit the present invention. The preferred embodiments of the present invention can be modified or improved without departing from the scope thereof and that their equivalents can be also included in the present invention.

In the preferred embodiments described above, the fan 79 produces an air flow which cools a portion of the engine unit 25 while the vehicle 1 is running. When referred to herein, the expression the "vehicle 1 is running" does not indicate specifically all the time during which the vehicle 1 is running but means at least a portion of the time during which the vehicle 1 is running. Namely, the fan 79 may be driven continuously or may be driven intermittently while the vehicle 1 is running. Additionally, the fan 79 may be driven at other times than while the vehicle 1 is running such as while the vehicle 1 is idling.

In the preferred embodiments described above, the entire the ventilation opening 74 is preferably disposed in the areas located directly behind the lower cover portion 70 in the front-rear direction of the body frame 21, ahead of the rear end BWB of the rear wheel 4 in the front-rear direction of the body frame 21, on the right of the left end LWL of the left front wheel 31 in the left-right direction of the body frame 21, and on the left of the right end RWR of the right front wheel 32 in the left-right direction of the body frame 21 in such a state that the body frame 21 is in the upright state and the left front wheel 31 and the right front wheel 32 are not turned by the steering device 7. However, the ventilation opening 74 may be partially disposed in other areas than those areas described above.

In the preferred embodiments described above, the ventilation opening 74 is preferably provided in the radiator cover 73. However, the location of the ventilation opening 74 can be set as long as the ventilation opening 74 allows an air flow directed toward the fan 79 to pass therethrough. For example, the ventilation opening 74 may be located at any appropriate position on the body cover 22.

In the preferred embodiments described above, the ventilation opening 74 preferably intersects the left-right direction of the body frame 21. However, the orientation of the ventilation opening 74 can be set as long as the ventilation opening 74 allows an air flow directed toward the fan 79 to pass therethrough. For example, the ventilation opening 74 may intersect at least either of the front-rear direction and the up-down direction of the body frame 21.

In the preferred embodiments described above, the radiator 77 is preferably disposed in the position where the air flow directed toward the fan 79 passes therethrough. Namely, the radiator 77 is disposed on an upstream side of the fan 79 in relation to an air flow which is produced by driving the fan 79. However, the radiator 77 may be disposed in a position where the air flow which has passed through the fan 79 is brought into contact with the radiator 77. Namely, the radiator 77 may be disposed on a downstream side of the fan 79 in relation to an air flow which is produced by driving the fan 79.

In the preferred embodiments described above, the fan 79 is preferably disposed in the position where the air flow directed toward the engine 71 passes therethrough. Namely, the engine 71 is disposed on a downstream side of the fan 79 in relation to an air flow which is produced by driving the fan 79. However, the engine 71 may be disposed in a position where an air flow directed toward the fan 79 passes there through. Namely, the engine 71 may be disposed on an upstream side of the fan 79 in relation to an air flow which is produced by driving the fan 79.

In the preferred embodiments described above, the engine unit 25 is preferably a water-cooled unit including the radiator 77. However, the vehicle 1 may be configured so as to include an air-cooled engine unit which uses no radiator 77 as long as the engine 71 is disposed so that an air flow that has passed through the ventilation opening 74 is brought into contact with the engine 71.

For example, in FIG. 9, an opening is provided below the fan 79 or below the engine 71 so that the air flow that has passed through the fan 79 is released downward of the vehicle 1. The speed of air which flows below the vehicle 1 while the vehicle 1 is running is faster than the speed of air which flows through the position where the ventilation opening 74 is provided. Consequently, the pressure below the vehicle 1 is lower than the pressure in the position where the ventilation opening 74 is provided. Consequently, according to this configuration, an air flow which cools a portion of the engine unit 25 is allowed to flow smoothly. This enables the engine unit 25 to be cooled efficiently while reducing further the size of the vehicle 1 which includes the leanable body frame 21 and the two front wheels 3 which are disposed so as to be side by side in the left-right direction of the body frame 21.

In the above preferred embodiments, the left shock absorbing mechanism 33 and the right shock absorbing mechanism 34 each preferably include the pair of telescopic mechanisms. However, the left shock absorbing mechanism 33 and the right shock absorbing mechanism 34 may each include a single telescopic mechanism.

In the above preferred embodiments, the vehicle 1 includes the single rear wheel 4. However, a plurality of rear wheels may be provided.

In the above preferred embodiments, the center of the rear wheel 4 in relation to the left-right direction of the body frame 21 preferably coincides with the center of the distance defined between the left front wheel 31 and the right front wheel 32 in relation to the left-right direction of the body frame 21. Although the configuration described above is preferable, the center of the rear wheel 4 in relation to the left-right direction of the body frame 21 may not coincide with the center of the distance defined between the left front wheel 31 and the right front wheel 32 in relation to the left-right direction of the body frame 21.

In the above preferred embodiments, the link mechanism 5 preferably includes the upper cross member 51 and the lower cross member 52. However, the link mechanism 5 may include a cross member other than the upper cross member 51 and the lower cross member 52. The "upper cross member" and the "lower cross member" are merely so called based on their relative positions in relation to the up-down direction. The upper cross member does not necessarily mean an uppermost cross member in the link mechanism 5. The upper cross member means a cross member which lies above another cross member which lies therebelow. The lower cross member does not necessarily mean a lowermost cross member in the cross mechanism 5. The lower cross member means a cross member which lies below another cross member which lies thereabove. At least one of the upper cross member 51 and the lower cross member 52 may include two portions such as a right cross member and a left cross member. In this manner, the upper cross member 51 and the lower cross member 52 may include a plurality of cross members as long as they maintain the link function.

In the above preferred embodiments, the link mechanism 5 preferably defines a parallel four joint link system. However, the link mechanism 5 may use a double wishbone configuration.

The terms and expressions that are used in this description are used to describe the preferred embodiments of the present invention and hence should not be construed as limiting the scope of the present invention. It should be understood that any equivalents to the characteristic matters that are shown and described in this description should not be excluded and that various modifications made within the scope of claims to be made later are permitted.

When used in this description, the word "parallel" means that two straight lines which do not intersect each other as members while they are inclined at an angle falling within the range of ±40 degrees are included therein. When used in this description in relation to a direction and/or a member, the word "along" means that a case where the direction or the member is inclined at an angle falling within the range of ±40 degrees is included therein. When used in this description, the expression "something extends in a certain direction" means that a case where something extends while being inclined at an angle falling within the range of ±40 degrees relative to the certain direction is included therein.

The present invention can be embodied in many different forms. This description should be regarded as providing the preferred embodiments according to the principles of the present invention. The preferred embodiments which are at least described or illustrated in this description is so described or illustrated based on the understanding that the preferred embodiments are not intended to limit the present invention.

The present invention includes every preferred embodiment which includes an equivalent element, a modification, a deletion, a combination (for example, a combination of characteristics of various preferred embodiments), an improvement and an alteration which can be recognized by those skilled in the art to which the present invention pertains based on the preferred embodiments disclosed in this description. The limitative matters of claims should be construed broadly based on terms used in the claims and hence should not be limited by the preferred embodiments described in this specification or the prosecution of this patent application. The preferred embodiments should be construed as being non-exclusive. For example, in this description, the terms "preferable" and "may" should be construed as being non-exclusive, and those terms mean, respectively, that it is "preferable but not limited thereto" and that it "may be acceptable but not limited thereto."

This application claims priority to Japanese Patent Application No. 2013-138484 filed on Jul. 1, 2013, the entire contents of which are hereby incorporated by reference. That is, the configurations listed below also constitute a portion of the description of the present application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A vehicle comprising:
   a body frame that leans to the left when the vehicle turns left, and that leans to the right when the vehicle turns right;
   a left front wheel and a right front wheel arranged side by side in a left-right direction of the body frame;
   a rear wheel disposed behind the left front wheel and the right front wheel in a front-rear direction of the body frame;
   a link mechanism that changes positions of the left front wheel and the right front wheel relative to the body frame to cause the body frame to lean to the left or to the right;
   a front cover covering at least a portion of the link mechanism;
   a steering device that turns the left front wheel and the right front wheel;
   an engine unit including an engine, the engine unit being disposed behind the left front wheel and the right front wheel in the front-rear direction of the body frame;

an inner fender including a lower cover portion disposed behind rear ends of the left front wheel and the right front wheel in the front-rear direction of the body frame, disposed ahead of the engine unit in the front-rear direction of the body frame, and disposed below upper ends of the left front wheel and the right front wheel in an up-down direction of the body frame;

a fan that generates, at least when the vehicle is running, an air flow to cool a portion of the engine unit by dissipating heat generated from the engine; and a ventilation opening that causes, at least when the vehicle is running, air flow directed to the fan to pass therethrough; wherein under a condition that the body frame is in an upright state and a condition that the left front wheel and the right front wheel are not turned by the steering device, the ventilation opening is disposed directly behind the lower cover portion in the front-rear direction of the body frame, disposed ahead of a rear end of the rear wheel, disposed on the right of a left end of the left front wheel in the left-right direction of the body frame, and disposed on the left of a right end of the right front wheel in the left-right direction of the body frame.

2. The vehicle as set forth in claim 1, wherein the ventilation opening opens in the left-right direction of the body frame.

3. The vehicle as set forth in claim 1, wherein the engine unit includes a radiator, and the radiator is disposed such that the air flow having passed through the ventilation opening comes into contact with the radiator.

4. The vehicle as set forth in claim 3, wherein the radiator is disposed such that the air flow directed to the fan passes through the radiator.

5. The vehicle as set forth in claim 1, wherein the engine is disposed such that the air flow having passed through the ventilation opening comes into contact with the engine.

6. The vehicle as set forth in claim 5, wherein the fan is disposed such that the air flow directed to the engine passes through the fan.

* * * * *